(12) United States Patent
Nishikawa et al.

(10) Patent No.: US 6,461,694 B1
(45) Date of Patent: Oct. 8, 2002

(54) OPTICAL COMPENSATORY SHEET COMPRISING TRANSPARENT SUPPORT, ORIENTATION LAYER AND OPTICALLY ANISOTROPIC LAYER

(75) Inventors: Hideyuki Nishikawa; Ken Kawata, both of Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/672,972

(22) Filed: Sep. 29, 2000

(30) Foreign Application Priority Data

Sep. 29, 1999 (JP) .............................. 11-276742

(51) Int. Cl.[7] ..................... C09K 19/32; G02F 1/1335
(52) U.S. Cl. ................... 428/1.3; 428/1.31; 349/117; 349/121
(58) Field of Search .................. 252/299.5, 299.62; 349/117, 121; 428/1.3, 1.31

(56) References Cited

U.S. PATENT DOCUMENTS

| | | | | |
|---|---|---|---|---|
| 5,736,067 A | * | 4/1998 | Kawata et al. | ........... 252/299.5 |
| 6,061,113 A | * | 5/2000 | Kawata | ..................... 349/117 |
| 6,245,398 B1 | * | 6/2001 | Matsuoka et al. | ........... 428/1.3 |

FOREIGN PATENT DOCUMENTS

| | | | |
|---|---|---|---|
| EP | 864885 A1 | * | 9/1998 |
| JP | 2000-086589 | | 3/2000 |
| JP | 2000104073 | * | 4/2000 |

* cited by examiner

Primary Examiner—Shean C. Wu
(74) Attorney, Agent, or Firm—Burns, Doane, Swecker & Mathis, LLP

(57) ABSTRACT

An optical compensatory sheet comprises a transparent support, an orientation layer and an optically anisotropic layer in this order. The optically anisotropic layer is formed from discotic liquid crystal molecules. The discotic liquid crystal molecule comprises a triphenylene nucleus and six cinnamoyl side chains. The optically anisotropic layer has a high refractive anisotropy in the range of 0.065 to 0.16.

14 Claims, 5 Drawing Sheets

Fig. 5
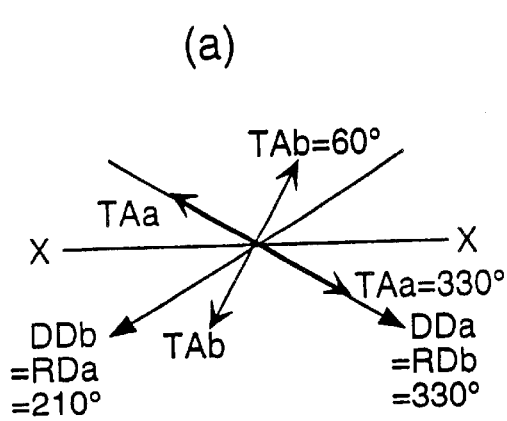
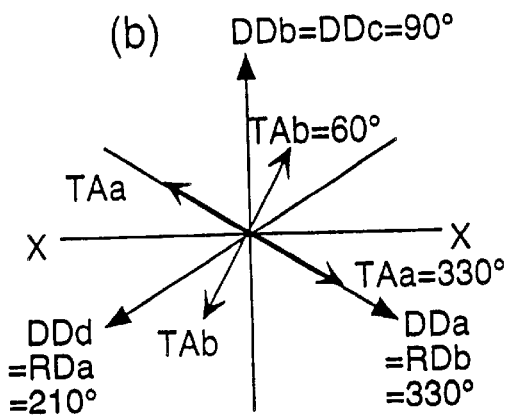
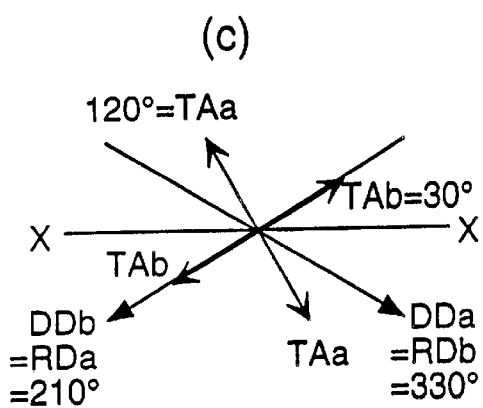
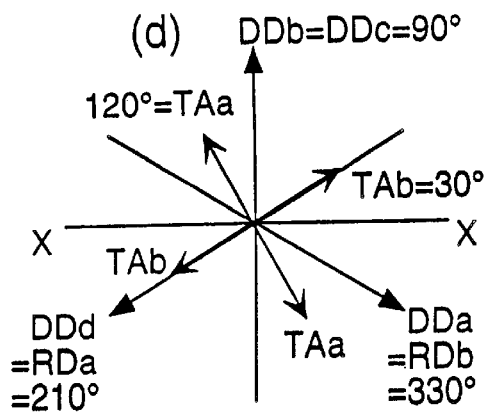
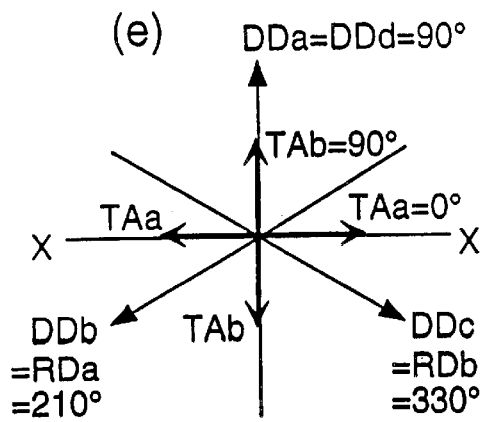

OPTICAL COMPENSATORY SHEET COMPRISING TRANSPARENT SUPPORT, ORIENTATION LAYER AND OPTICALLY ANISOTROPIC LAYER

FIELD OF THE INVENTION

The present invention relates to an optical compensatory sheet comprising a transparent support and an optically anisotropic layer provided thereon and formed from discotic liquid crystal molecules. The invention also relates to a liquid crystal display equipped with the optical compensatory sheet.

BACKGROUND OF THE INVENTION

A liquid crystal display of an STN mode comprises a liquid crystal cell of an STN (Super Twisted Nematic) mode, two polarizing elements placed on both sides of the liquid crystal cell, and one or two optical compensatory sheets (phase retarders) placed between the liquid crystal cell and the polarizing element.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. Each of the substrates has an orientation layer, which has a function of aligning the rod-like liquid crystal molecules. The rod-like liquid crystal molecules are twisted with a chiral agent. A twist angle of the molecules is in the range of 180° to 360°. The liquid crystal display of the STN mode can give a clear image with a large capacity according to a time-sharing addressing method even if the display has a simple matrix electrode structure (having no active matrix such as a thin film transistor or a diode).

Without an optical compensatory sheet, a liquid crystal display of an STN mode gives an image colored blue or yellow because of birefringence of rod-like liquid crystal molecules. The blue or yellow color is inconvenient for not only a black and white image but also a color image. An optical compensatory sheet has a function of removing color from an image to display a bright and clear image. The optical compensatory sheet also has a function of enlarging a viewing angle of a liquid crystal cell. As the optical compensatory sheet, a stretched birefringent film has been usually used. Japanese Patent Provisional Publication Nos. 7(1995)-104284 and 7(1995)-13021 disclose an optical compensatory sheet of a stretched birefringent film for a liquid crystal display of an STN mode.

In place of the stretched birefringent film, an optical compensatory sheet comprising an optically anisotropic layer on a transparent support has been proposed. The optically anisotropic layer is formed by aligning discotic liquid crystal molecules and fixing the aligned molecules. The discotic liquid crystal molecules usually have large birefringence, and they also have various alignment forms. Accordingly, an optical compensatory sheet obtained from the discotic liquid crystal molecules has a specific optical characteristic that cannot be obtained by the conventional stretched birefringent film.

B. Mourey et al. disclose a triphenylene discotic liquid crystal molecule having negative birefringence [Mol. Cryst. Liq. Cryst. vol. 84 (1982) pp. 193]. In the case that this discotic liquid crystal molecule is used for an optical compensatory sheet, it is necessary to align the molecules uniformly in the optically anisotropic layer. Accordingly, it is preferred to orient the discotic liquid crystal molecules in monodomain alignment. However, conventional discotic liquid crystal molecules form dual domain alignment, and hence defects are often observed at the interface between the domains. Because of this, conventional discotic liquid crystal molecules hardly give optical characteristics required for an optical compensatory sheet. Since optical characteristics of discotic liquid crystal molecules generally depend on the chemical structure of the molecules, many kinds of discotic liquid crystal molecules have been studied and developed to obtain desired optical characteristics.

Japanese Patent Provisional Publication Nos. 7(1995)-306317 and 9(1997)-104866 disclose 2,3,6,7,10,11-hexa{4-(4-acryloyloxyhexyloxy)benzoyloxy}triphenylene as a discotic liquid crystal compound to form an optically anisotropic layer of optical compensatory sheet.

The retardation ($\Delta$nd) of optical compensatory sheet is determined according to the optical characteristics of the liquid crystal cell to compensate. The retardation ($\Delta$nd) is defined as a product of the refractive anisotropy ($\Delta$n) and the optical thickness (d) of the optically anisotropic layer, and therefore an optically anisotropic layer having a high refractive anisotropy ($\Delta$n) can satisfyingly compensate the liquid crystal cell even if the thickness (d) is small.

It is very difficult to form an optically anisotropic layer having a sufficiently high refractive anisotropy ($\Delta$n) from the discotic liquid crystal compound disclosed in Japanese Patent Provisional Publication Nos. 7(1995)-306317 and 9(1997)-104866.

SUMMERY OF THE INVENTION

An object of the present invention is to provide an optical compensatory sheet comprising an optically anisotropic layer having a high refractive anisotropy.

The present invention provides an optical compensatory sheet comprising a transparent support, an orientation layer and an optically anisotropic layer formed from discotic liquid crystal molecules represented by the formula (I) in this order, said optically anisotropic layer having a refractive anisotropy in the range of 0.065 to 0.16:

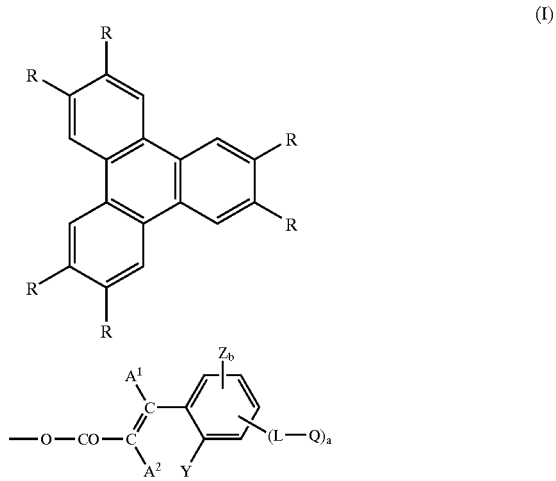

in which each of $A^1$ and $A^2$ independently is hydrogen, a halogen atom, an alkyl group having 1 to 12 carbon atoms or an alkoxy group having 1 to 12 carbon atoms; Y is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms, or Y is combined with $A^2$ to form a five-membered or six-membered ring; Z is a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms; L is a divalent linking group selected from the group consisting of —O—, —Co—, —S—, —NH—, an alkylene group, an alkenylene group, an alkynylene group, an arylene group and a combination thereof; Q is a polymerizable group; a is 1, 2, 3 or 4; and b is an integer of 0 to 4-a.

The invention also provides a liquid crystal display comprising a liquid crystal cell of an STN mode, two polarizing plates placed on both sides of the liquid crystal cell, and one or two optical compensatory sheets placed between the liquid crystal cell and the polarizing plate, wherein the optical compensatory sheet comprises a transparent support, an orientation layer and an optically anisotropic layer formed from discotic liquid crystal molecules represented by the formula (I) in this order, said optically anisotropic layer having a refractive anisotropy in the range of 0.065 to 0.16, and said discotic liquid crystal. molecules being aligned at an average inclined angle of 50° to 90° and being twisted at a twist angle of 90° to 360°.

The invention further provides liquid crystal display comprising a liquid crystal cell of a TN mode, two polarizing plates placed on both sides of the liquid crystal cell, and one or two optical compensatory sheets placed between the liquid crystal cell and the polarizing plate, wherein the optical compensatory sheet comprises a transparent support, an orientation layer and an optically anisotropic layer formed from discotic liquid crystal molecules represented by the formula (I) in this order, said optically anisotropic layer having a refractive anisotropy in the range of 0.065 to 0.16, and said discotic liquid crystal molecules being so aligned that the inclined angle changes according to the distance between the molecule and the plane of the transparent support.

The applicants have studied and found that an optically anisotropic layer formed from discotic liquid crystal molecules represented by the formula (I) has a high refractive anisotropy of 0.065 to 0.16.

The optically anisotropic layer having a high refractive anisotropy compensates a liquid crystal cell sufficiently even if the thickness is relatively small. Therefore, a relatively thin optically anisotropic layer can be used in an optical compensatory sheet. The alignment of discotic liquid crystal molecules can easily be controlled in the thin optically anisotropic layer. Accordingly, the alignment can be adjusted under the optimum conditions.

The alignment of discotic liquid crystal molecules can easily be controlled in the optical compensatory sheet of the invention. Therefore, the sheet can advantageously be used in not only a liquid crystal display of a STN mode (for which the applicants have first studied) but also other displays (e.g., a display of a TN mode) by adjusting the alignment according to the display mode.

BRIEF DESCRIPTION OF THE DRAWINGS

FIG. 5 is a plane view showing other preferred optical directions about elements of a liquid crystal display of an STN mode.

DETAILED DESCRIPTION OF THE INVENTION

Figure 1:
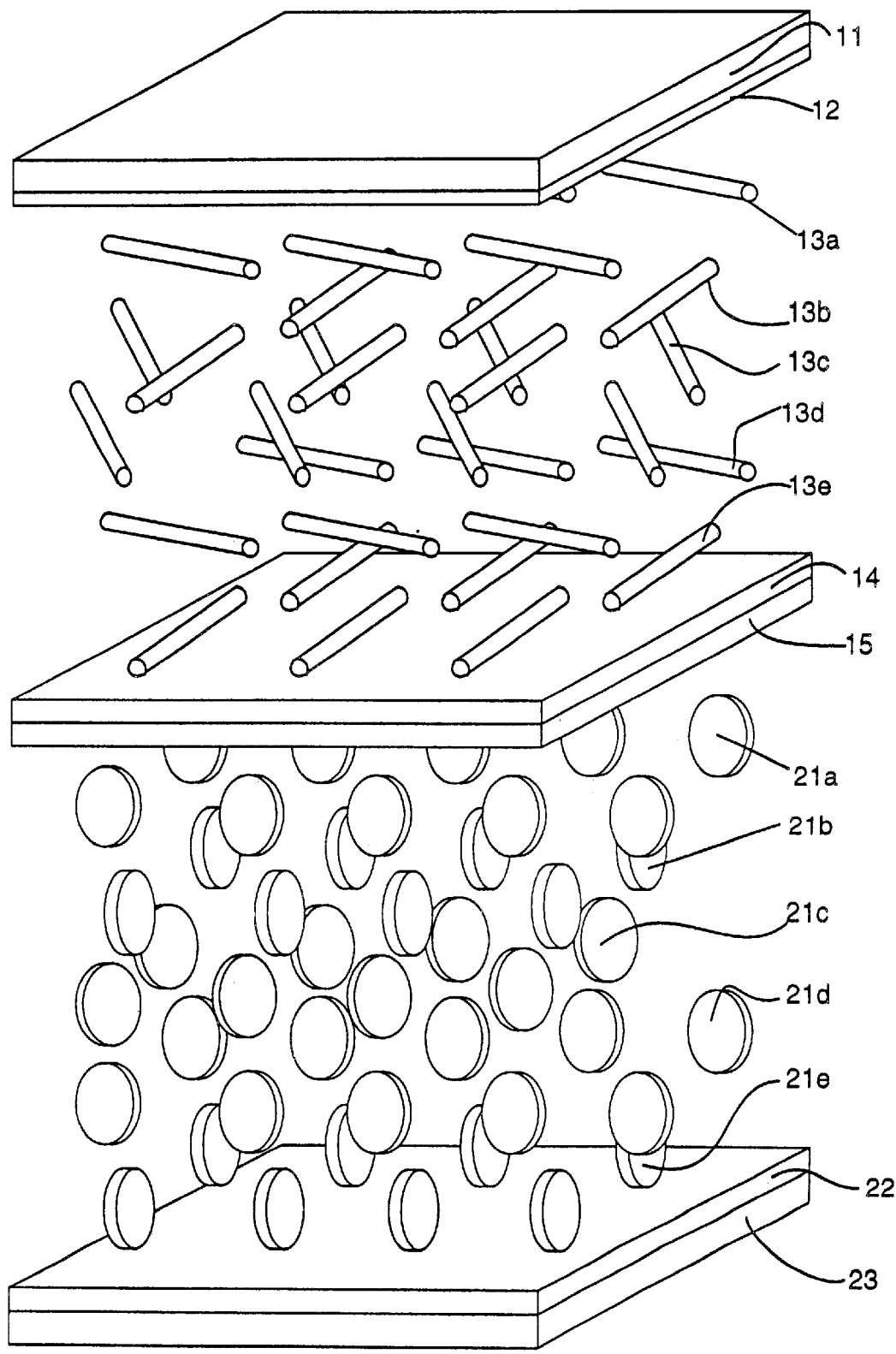
FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

FIG. 1 is a sectional view schematically illustrating alignment of rod-like liquid crystal molecules in a liquid crystal cell of an STN mode and alignment of discotic liquid crystal molecules in an optically anisotropic layer when voltage is not applied (off) to the cell.

As is shown in FIG. 1, a liquid crystal cell (11 to 15) comprises an upper substrate (11) having an upper orientation layer (12), a lower substrate (15) having a lower orientation layer (14) and a liquid crystal layer comprising rod-like liquid crystal molecules (13a to 13e) sealed between the orientation layers (12 & 14). The rod-like liquid crystal molecules (13a to 13e) are aligned by functions of the orientation layers (12 & 14), and are twisted by a function of a chiral agent (not shown) contained in the liquid crystal layer.

Each of the upper substrate (11) and the lower substrate (15) has an electrode (not shown), which has a function of applying voltage to the rod-like liquid crystal molecules (13a to 13e).

When voltage is not applied to the liquid crystal cell of an STN mode (off), the rod-like liquid crystal molecules (13a to 13e) are almost horizontally aligned parallel to the surface of the orientation layers (12 & 14), as is shown in FIG. 1. The rod-like liquid crystal molecules (13a to 13e) are twisted along a thickness direction, and spiral on a plane (counterclockwise about 240° from 13a to 13e in FIG. 1).

When voltage is applied to the liquid crystal cell of an STN mode (on), rod-like liquid crystal molecules placed in the middle of the cell (13b to 13d) are rather vertically aligned (realigned parallel to a direction of an electric field), compared with FIG. 1 (off). On the other hand, the alignment of the other rod-like liquid crystal molecules (13a, 13e) neighboring the orientation layers (12, 14). is not essentially changed even after applying voltage to the cell.

An optical compensatory sheet is provided under the liquid crystal cell. The optical compensatory sheet shown in FIG. 1 comprises a transparent support (23), an orientation layer (22) and an optically anisotropic layer piled up in order. The optically anisotropic layer is formed by aligning discotic liquid crystal molecules (21a to 21e) and fixing the molecules with the alignment maintained.

According to the present invention, discotic liquid crystal molecules (21a to 21e) are so aligned that discotic planes of the molecules are essentially perpendicular to a surface of the orientation layer (22). The discotic liquid crystal molecules (21a to 21e) are preferably twisted along a thickness direction, and spiral on a plane (clockwise about 240° from 21a to 21e in FIG. 1).

In FIG. 1, the alignment of each rod-like liquid crystal molecule corresponds to that of each discotic liquid crystal molecule, namely 13a to 21e, 13b to 21d, 13c to 21c, 13d to 21b and 13e to 21a. Accordingly, the discotic liquid crystal molecule 21e optically compensates the rod-like liquid crystal molecule 13a, 21d compensates 13b, 21c compensates 13c, 21b compensates 13d, and 21a compensates 13e. The optical relation between the rod-like liquid crystal molecule and the discotic liquid crystal molecule is described below referring to FIG. 2.

Figure 2:
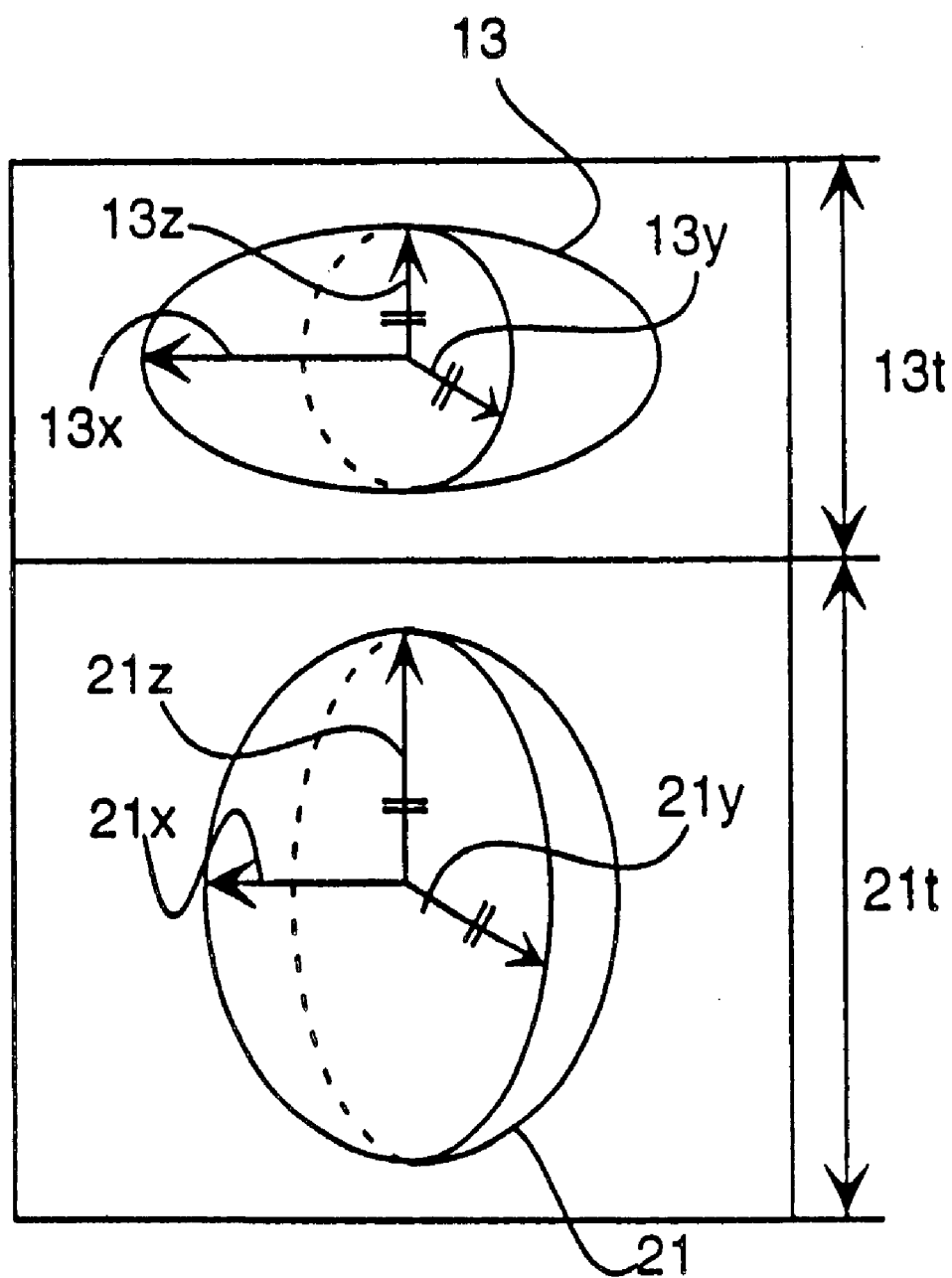
FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

FIG. 2 schematically illustrates a refractive index ellipsoid of a rod-like liquid crystal molecule in a liquid crystal cell and a refractive index ellipsoid of a discotic liquid crystal molecule in an optical anisotropic layer, which optically compensates the rod-like liquid crystal molecule.

The refractive index ellipsoid (13) of a rod-like liquid crystal molecule in a liquid crystal cell is formed from refractive indices (13x, 13y) in a plane parallel to an orientation layer and a refractive index (13z) along the thickness direction. In a liquid crystal cell of an STN mode, the refractive index (13x) along one direction in the place is relatively large, while the index (13y) along a direction perpendicular to the direction of (13x) is relatively small. The refractive index (13z) along the thickness direction is also relatively small in a liquid crystal cell of an STN mode. Therefore, the refractive index ellipsoid (13) has a shape like a laid football, as is shown in FIG. 2. The liquid crystal cell having the refractive index ellipsoid (not spherical) shows a birefringence depending on a viewing angle. The dependency on the viewing angle is canceled by an optical compensatory sheet.

The refractive index ellipsoid (21) of a discotic liquid crystal molecule in an optical compensatory sheet is also formed from refractive indices (21x, 21y) in a plane parallel to an orientation layer and a refractive index (21z) along the thickness direction. The refractive index (21x) along one direction in the place is relatively small, while the index (21y) along a direction perpendicular to the direction of (21x) is relatively large. The refractive index (121z) along the direction is also relatively large. These refractive indices are obtained by aligning discotic liquid crystal molecules essentially vertically. Therefore, the refractive index ellipsoid (21) has a shape like a standing disk, as is shown in FIG. 2.

A retardation formed in a liquid crystal cell (1) can be compensated by a retardation formed in an optical compensatory sheet (2) because of the above-described relation. The dependency on a viewing angle can be canceled by adjusting refractive indices (13x, 13y, 13z) of rod-like liquid crystal molecules, refractive indices (21x, 21y, 21z) of discotic liquid crystal molecules, a thickness (13t) of the rod-like liquid crystal molecule layer and a thickness (21t) of the discotic liquid crystal molecule layer according to the following formulas:

$$|(13x-13y)\times 13t|=|(21x-21y)\times 21t|$$

$$|(13x-13z)\times 13t|=|(21x-21z)\times 21t|.$$

Figure 3:
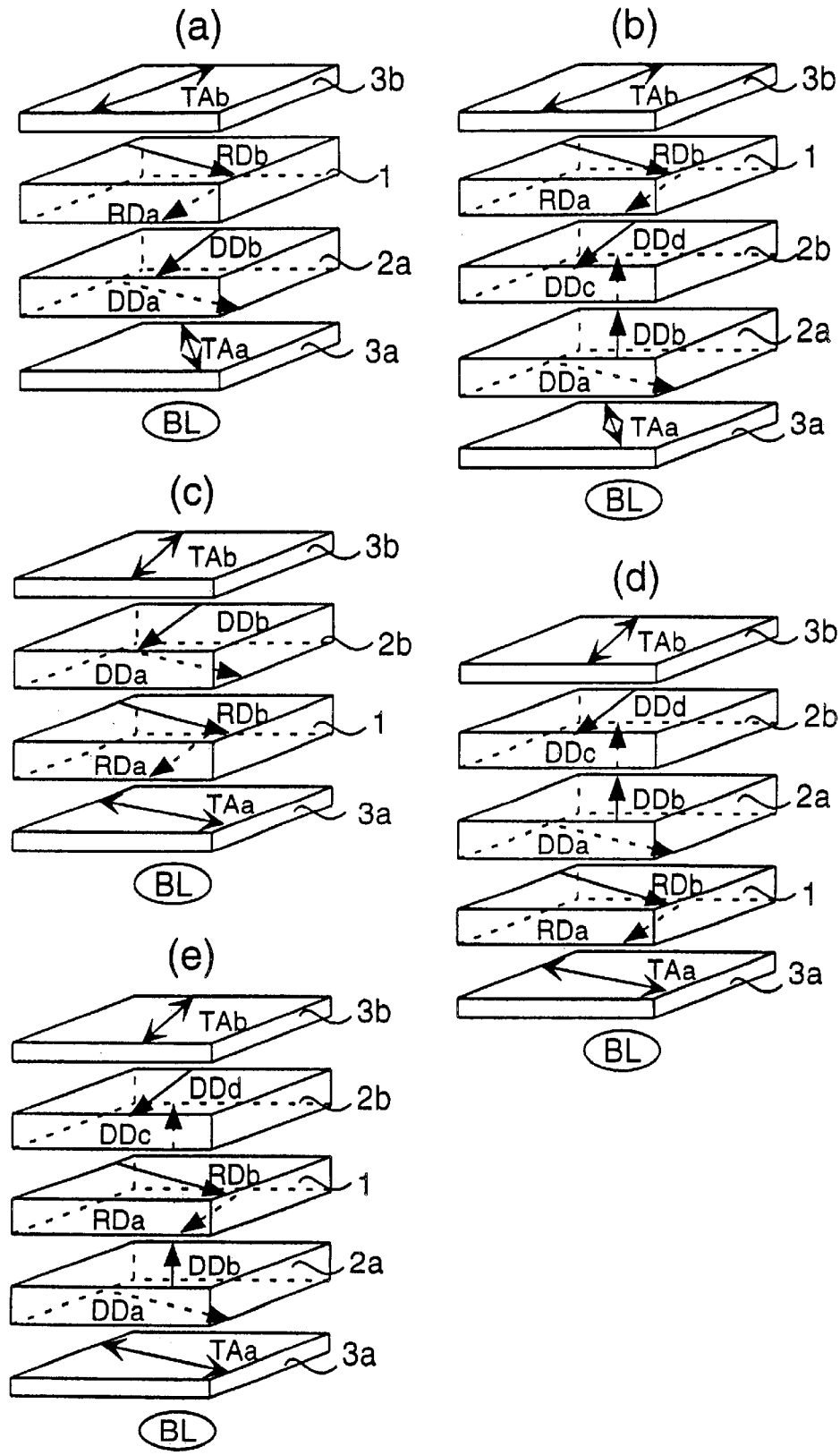
FIG. 3 schematically illustrates a layered structure of a liquid crystal display of an STN mode.

FIG. 3 schematically illustrates a layered structure of a liquid crystal display of an STN mode.

The liquid crystal display shown in FIG. 3(a) comprises a backlight (BL), a lower polarizing element (3a), a lower optical compensatory sheet (2a), a liquid crystal cell of an STN mode (1) and an upper polarizing element (3b) in order.

The liquid crystal display shown in FIG. 3(b) comprises a backlight (BL), a lower polarizing element (3a), a lower optical compensatory sheet (2a), an upper optical compensatory sheet (2b), a liquid crystal cell of an STN mode (1) and an upper polarizing element (3b) in order.

The liquid crystal display shown in FIG. 3(c) comprises a backlight (BL), a lower polarizing element (3a), a liquid crystal cell of an STN mode (1), an upper optical compensatory sheet (2b) and an upper polarizing element (3b) in order.

The liquid crystal display shown in FIG. 3(d) comprises a backlight (BL), a lower polarizing element (3a), a liquid crystal cell of an STN mode (1), a lower optical compensatory sheet (2a), an upper optical compensatory sheet (2b) and an upper polarizing element (3b) in order.

The liquid crystal display shown in FIG. 3(e) comprises a backlight (BL), a lower polarizing element (3a), a lower optical compensatory sheet (2a), a liquid crystal cell of an STN mode (1), an upper optical compensatory sheet (2b) and an upper polarizing element (3b) in order.

FIG. 3 shows arrows indicating the following optical directions.

TAa: Transparent axis (TAa) of a lower polarizing element (3a).

DDa: Normal (director's) direction of a discotic plane of a discotic liquid crystal molecule adjacent to an orientation layer in a lower optical compensatory sheet (2a).

DDb: Normal (director's) direction of a discotic plane of a discotic liquid crystal molecule adjacent to a liquid crystal cell in a lower optical compensatory sheet (2a).

RDa: Rubbing direction of a lower orientation layer of a liquid crystal cell (1).

RDb: Rubbing direction of an upper orientation layer of a liquid crystal cell (1).

DDc: Normal (director's) direction of a discotic plane of a discotic liquid crystal molecule adjacent to a liquid crystal cell in an upper optical compensatory sheet (2b).

DDd: Normal (director's) direction of a discotic plane of a discotic liquid crystal molecule adjacent to an orientation layer in an upper optical compensatory sheet (2b).

TAa: Transparent axis of a lower polarizing element (3a).

TAb: Transparent axis of an upper polarizing element (3b).

The angles between the optical directions are described below referring to FIG. 4 and FIG. 5.

Figure 4:
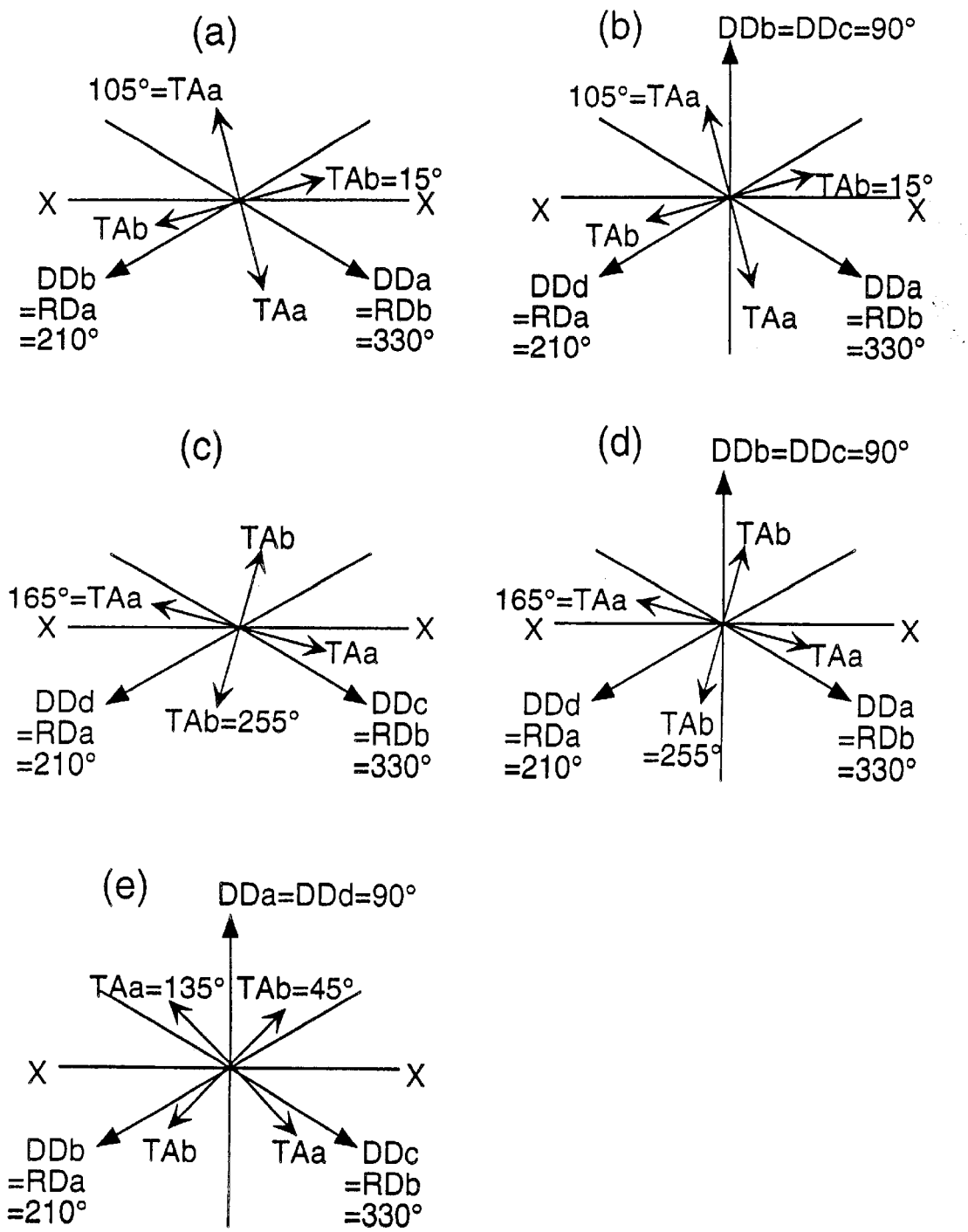
FIG. 4 is a plane view showing preferred optical directions about elements of a liquid crystal display of an STN mode.

FIG. 4 is a plane view showing preferred optical directions about elements of a liquid crystal display of an STN mode. FIG. 4 shows arrangements taking account of a front contrast.

FIG. 4(a) shows preferred optical directions in a liquid crystal display comprising one optical compensatory sheet between a lower polarizing element and a liquid crystal cell of an STN mode, as is shown in FIG. 3(a).

FIG. 4(b) shows preferred optical directions in a liquid crystal display comprising two optical compensatory sheets between a lower polarizing element and a liquid crystal cell of an STN mode, as is shown in FIG. 3(b).

FIG. 4(c) shows preferred optical directions in a liquid crystal display comprising one optical compensatory sheet between a liquid crystal cell of an STN mode and an upper polarizing element, as is shown in FIG. 3(c).

FIG. 4(d) shows preferred optical directions in a liquid crystal display comprising two optical compensatory sheets between a liquid crystal cell of an STN mode and an upper polarizing element, as is shown in FIG. 3(d).

FIG. 4(e) shows preferred optical directions in a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 4, the line (X—X) means a standard direction (0°). The arrows shown in FIG. 4 have the same meanings as is described about FIG. 3. The transparent axis of the lower polarizing element (TAa) and the transparent axis of the upper polarizing element (TAb) can be replaced with each other.

FIG. 5 is a plane view showing other preferred optical directions about elements of a liquid crystal display of an STN mode. FIG. 6 shows arrangements taking account of color of a displayed image.

FIG. 5(a) shows preferred optical directions in a liquid crystal display comprising one optical compensatory sheet between a lower polarizing element and a liquid crystal cell of an STN mode, as is shown in FIG. 3(a).

FIG. 5(b) shows preferred optical directions in a liquid crystal display comprising two optical compensatory sheets between a lower polarizing element and a liquid crystal cell of an STN mode, as is shown in FIG. 3(b).

FIG. 5(c) shows preferred optical directions in a liquid crystal display comprising one optical compensatory sheet between a liquid crystal cell of an STN mode and an upper polarizing element, as is shown in FIG. 3(c).

FIG. 5(d) shows preferred optical directions in a liquid crystal display comprising two optical compensatory sheets between a liquid crystal cell of an STN mode and an upper polarizing element, as is shown in FIG. 3(d).

FIG. 5(e) shows preferred optical directions in a liquid crystal display comprising one optical compensatory sheet between a lower polarizing element and a liquid crystal display of an STN mode, and another optical compensatory sheet between the liquid crystal cell and an upper polarizing element, as is shown in FIG. 3(e).

In FIG. 5, the line (X—X) means a standard direction (0°). The arrows shown in FIG. 5 have the same meanings as is described about FIG. 3. The transparent axis of the lower polarizing element (TAa) and the transparent axis of the upper polarizing element (TAb) can be replaced with each other.

[Transparent Support]

A transparent support is preferably made of a polymer film, which more preferably is optical isotropic. The term "transparent" means that light transmittance is not less than 80%. The term "optical isotropic" means that a retardation in the plane (Re) of the film is PREFERABLY not more than 20 nm, and more preferably not more than 10 nm. A retardation along the thickness direction (Rth) of the film is preferably not more than 100 nm, and more preferably not more than 50 nm. The Re and Rth retardation values are defined by the following formulas:

$$Re = (nx^1 - ny^1) \times d^1$$

$$Rth = [\{(nx^1 + ny^1)/2\} - nz^1] \times d^1$$

in which each of $nx^1$ and $ny^1$ is a refractive index in the plane of the transparent support; $nz^1$ is a refractive index along the thickness direction of the transparent support; and $d^1$ is the thickness of the transparent support.

Examples of the polymers include cellulose ester, polycarbonate, polysulfone, polyethersulfone, polyacrylate and polymethacrylate. Cellulose ester is preferred, cellulose acetate is more preferred, and cellulose triacetate is most preferred. The polymer film is formed preferably according to a solvent casting method.

The transparent support has a thickness preferably in the range of 20 to 500 μm, and more preferably in the range of 50 to 200 μm.

The transparent support can be subjected to a surface treatment (e.g., glow discharge treatment, corona discharge treatment, ultraviolet (UV) treatment, flame treatment) to improve adhesion to a layer formed on the support (e.g., adhesive layer, orientation layer, optically anisotropic layer). An adhesive layer (undercoating layer) can be provided on the transparent support.

[Orientation Layer]

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a layer containing the aforementioned polymer with paper or cloth several times along a certain direction.

The orientation layer has a thickness of preferably 0.01 to 10 μm, more preferably 0.05 to 1 μm.

In an optical compensatory sheet for a liquid crystal cell of a TN mode, discotic liquid crystal molecules are preferably aligned so that the inclined angle may change according to the distance between the molecule and the plane of the transparent support. Accordingly, as the polymer for the orientation layer, polymers which do not lower the surface energy of the layer (i.e., polymers generally used for the orientation layer) are preferably used. Those polymers are described in many publications, and many kinds of them are commercially available.

In an optical compensatory sheet for a liquid crystal cell of a STN mode, polymers which lower the surface energy of the layer are preferably used as the polymer for the orientation layer. For effectively lowering the surface energy of the layer, a hydrocarbon group having 10 to 100 carbon atoms which may be substituted with fluorine may be introduced to the polymer. The hydrocarbon groups are preferably placed near the surface of the orientation layer, and hence are introduced at the terminal of the side chain. The main chain of the polymer is preferably polyvinyl alcohol, polyacrylic acid or polymethacrylic acid.

Particularly preferably, the orientation layer in the optical compensatory sheet for a liquid crystal cell of a STN mode comprises a denatured polyvinyl alcohol, an acrylic copolymer or a methacrylic copolymer, each of which has a repeating unit represented by the formula (II) in an amount of 1 to 90 mol. %.

In the formula (II), $R^2$ is hydrogen, a halogen atom or an alkyl group having 1 to 6 carbon atoms. $R^2$ is preferably hydrogen or an alkyl group having 1 to 6 carbon atoms, more preferably hydrogen, methyl or ethyl, and most preferably hydrogen or methyl.

In the formula (II), $L^0$ is a divalent linking group selected from the group consisting of —O—, —CO—, —NH—, —SO$_2$—, an alkylene group, an alkenylene group, an arylene group and a combination thereof. In a denatured polyvinyl alcohol, $L^0$ is preferably —O—L$^{00}$— (in which the group of —O— is attached to the main chain, and L$^{00}$ is a divalent linking group selected from the group consisting of —O—, —CO—, —NH—, —SO$_2$—, an alkylene group, an alkenylene group, an arylene group and a combination thereof). In an acrylic copolymer or a methacrylic copolymer, $L^o$ is particularly preferably —CO—$L^{oo}$— (in which the group of —CO— is attached to the main chain, and $L^{oo}$ is a divalent linking group selected from the group consisting of —O—, —CO—, —NH—, —SO$_2$—, an alkylene group, an alkenylene group, an arylene group and a combination thereof).

In a denatured polyvinyl alcohol, $L^o$ preferably is —O—, —O-alkylene-, —O-alkylene-alkenylene-, —O-alkylene-arylene, —O-alkylene-O—, —O-alkylene-O—CO—, —O-alkylene-NH—SO$_2$-arylene-O—, —O-alkylene—O—CO-alkylene-O—, —O-alkylene-CO—NH—, —O-alkylene-NH—SO$_2$—, —O-alkylene-O—CO-arylene-, —O-arylene-O—CO-alkylene-O-arylene-, —O-arylene-, —O-alkylene-CO—O—, —O-alkylene-CO— or —O-arylene-CO—O—, more preferably is —O—, —O-alkylene-NH—SO$_2$-arylene-O—, —O-alkylene- or —O-alkylene-arylene-. In each of these linking groups, the left side is attached to the main chain, and the right side is attached to $R^o$.

In an acrylic copolymer or a methacrylic copolymer, $L^o$ preferably is —CO—O—, —CO—O-alkylene-, —CO—O-alkylene-alkenylene-, —CO—O-alkylene-arylene-, —CO—O-alkylene—O—, —CO—O-alkylene-O—CO—, —CO—O-alkylene-NH—SO$_2$-arylene-O—, —CO—O-alkylene-O—CO-alkylene-O—, —CO—O-alkylene-CO—NH—, —CO—O-alkylene-NH—SO$_2$—, —CO—O-alkylene-O—CO-arylene-, —CO—NH—, —CO—NH-arylene-, —CO—NH-arylene-CO—O—CO—O-arylene—O—CO-alkylene-O-arylene-, —CO—O-arylene-, —CO—NH-arylene-NH—CO—, —CO—NH-arylene-O—, —CO—O-alkylene-CO—O—, —CO-O-alkylene-CO—O—, —CO—O-arylene—CO—O— or —CO—NH-alkylene-NH—CO—O— more preferably is —CO—O—, —CO—O-alkylene-NH—SO$_2$-arylene-O—, —CO—NH—, —CO—NH-arylene—O—, —CO-O-alkylene-, —CO-O-alkylene-arylene- or —CO—O-alkylene-O—CO-arylene group-, and most preferably is —CO—O— or —CO—NH—. In each of these linking groups, the left side is attached to the main chain, and the right side is attached to $R^o$.

The alkylene group may have a branched or cyclic structure. The alkylene group has preferably 1 to 30, more preferably 1 to 15 and further preferably 1 to 12 carbon atoms.

The alkenylene group may have a branched or cyclic structure. The alkenylene group has preferably 2 to 30, more preferably 2 to 16 and further preferably 2 to 4 carbon atoms.

The arylene group is preferably phenylene or naphthylene, more preferably phenylene, and most preferably p-phenylene. The arylene group may have a substituent group. Examples of the substituent group include a halogen atom, carboxyl, cyano, nitro, carbamoyl, sulfamoyl, an alkyl group, a cycloalkyl group, an alkoxy group, an alkylthio group, an acyl group, an acyloxy group, an alkyl-substituted carbamoyl group, an alkyl-substituted sulfamoyl group, an amide group, a sulfonamide group and an alkylsulfonyl group.

In the formula (II), $R^o$ is a hydrocarbon group having 10 to 100 carbon atoms which may be substituted with fluorine atom.

The hydrocarbon group is an aliphatic group, an aromatic group or a combination thereof. The aliphatic group may have a cyclic, branched or straight chain structure, and is preferably an alkyl group (including a cycloalkyl group) or an alkenyl group (including a cycloalkenyl group). The hydrocarbon group can have a substituent group that is not strongly hydrophilic, such as a halogen atom. The hydrocarbon group contains preferably 10 to 80 carbon atoms, more preferably 10 to 60 carbon atoms, and most preferably 10 to 40 carbon atoms.

The hydrocarbon group preferably has a steroid structure, which not only lowers the surface energy of orientation layer but also shows an excluded volume effect. In cooperation with the lowered surface energy, the excluded volume effect makes the orientation layer vertically align liquid crystal molecules. In the present specification, the 'steroid structure' means a cyclopentanohydrophenanthrene ring or a ring obtained by replacing a single bond of the cyclopentanohydrophenanthrene ring with a double bond. The hydrocarbon group having a steroid structure has preferably 18 to 100 carbon atoms, more preferably 19 to 60 carbon atoms, and most preferably 20 to 40 carbon atoms.

The hydrocarbon group also preferably contains at least two aromatic rings or aromatic heterocyclic rings (more preferably at least two aromatic rings). Particularly preferably, the two aromatic rings connects with a single bond (i.e., they form a biphenyl structure) or with ethynylene (—C≡C—) bond (i.e., they form a tolane structure).

The hydrocarbon group can have a substituent group that is not strongly hydrophilic, other than fluorine atom. The denatured polyvinyl alcohol, acrylic copolymer or methacrylic copolymer has a repeating unit represented by the formula (II) in an amount of preferably 2 to 80 mol. %, and more preferably 3 to 70 mol. %.

Besides the repeating unit represented by the formula (II), the denatured polyvinyl alcohol further contains a repeating unit represented by the formula (III), which corresponds to vinyl alcohol. Furthermore, the denatured polyvinyl alcohol generally contains a repeating unit represented by the formula (IV), which corresponds to vinyl acetate, in addition to the repeating units represented by the formulas (II) and (III).

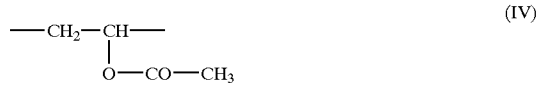

Polyvinyl alcohol generally prepared by saponification of polyvinyl acetate. Accordingly, polyvinyl alcohol usually contains the repeating unit of the formula (IV) in a certain amount. Therefore, the denatured polyvinyl alcohol having the repeating unit of the formula (II) also usually contains the repeating unit of the formula (IV) in a certain amount.

The acrylic or methacrylic copolymer contains a repeating unit represented by the formula (V), which corresponds to acrylic or methacrylic acid, besides the repeating unit of the formula (II).

In the formula (V), $R^1$ is hydrogen (acrylic copolymer) or methyl (methacrylic copolymer).

In the formula (V), M is proton, an alkali metal (e.g., Na, K) ion or an ammonium ion, which can be substituted with an organic group (e.g., methyl) to form a primary, secondary, tertiary or quaternary ammonium ion. Examples of the ammonium ion include $NH_4$, $NH_3CH_3$, $NH_2(CH_3)_2$, $NH(CH_3)_3$ and $N(CH_3)_4$.

At the terminal, the denatured polyvinyl alcohol may have a group other than the repeating units. Examples of the terminal group include an alkylthio group.

Polymerizable groups may be introduced into the denatured polyvinyl alcohol or (meth)acrylic copolymer. The denatured polyvinyl alcohol or (meth)acrylic copolymer having polymerizable groups and discotic liquid crystal molecules having polymerizable groups can be chemically combined along the interface between the optically anisotropic layer and the orientation layer, and thereby the durability of the optical compensatory sheet can be improved.

The polymerizable group is determined according to that of discotic liquid crystal molecule (Q) described after. The polymerizable group (Q) of discotic liquid crystal molecule preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6). The polymerizable group of the denatured polyvinyl alcohol or (meth)acrylic copolymer is also preferably an unsaturated polymerizable group, an epoxy group or an aziridinyl group, more preferably is an unsaturated polymerizable group, and most preferably is an ethylenically unsaturated group.

The polymerizable group preferably connects to the main chain not directly but through a linking group.

Examples of the linking group in the denatured polyvinyl alcohol include —O—, —O-alkylene group-, —O-alkylene group-alkenylene group-, —O-alkylene group-arylene group-, —O-alkylene group-O—, —O-alkylene group-O—CO—, —O-alkylene group-NH—SO$_2$-arylene group-O—, —O-alkylene group-O—CO-alkylene group-O—, —O-alkylene group-CO—NH—, —O-alkylene group-NH—SO$_2$—, —O-alkylene group-O—CO-arylene group-, —O-arylene group-, —O-alkylene group-CO—O—, —O-alkylene group-CO— and —O-arylene group—CO—O—. In each of these linking groups, the left side is attached to the main chain, and the right side is attached to the polymerizable group.

Examples of the linking group in the (meth)acrylic copolymer include —CO—, —CO—O—, —CO—NH—, —CO—NH-alkylene-, —CO—NH-alkylene-O—, —CO—NH-alkylene-CO—O—, —CO—NH-alkylene-O—CO—, —CO—NH-alkylene—CO—NH—, —CO-alkylene-O—CO—, —CO-arylene-O-alkylene-O—CO—. —CO-arylene-O-alkylene-O—, —CO-arylene—O-alkylene- and —CO-alkylene-O—CO—. In each of these linking groups, the left side is attached to the main chain, and the right side is attached to the polymerizable group.

The alkylene group may have a branched or cyclic structure. The alkylene group has preferably 1 to 30, more preferably 1 to 20, further preferably 1 to 15, most preferably 1 to 12 carbon atoms.

The arylene group is preferably phenylene or naphthylene, more preferably phenylene, and most preferably p-phenylene. The arylene group may have a substituent group. Examples of the substituent group include a halogen atom (F, Cl, Br), carboxyl, cyano, nitro, carbamoyl, sulfamoyl, an alkyl group, a cycloalkyl group, an alkoxy group, an alkylthio group, an acyl group, an acyloxy group, an alkylsubstituted carbamoyl group, an alkyl-substituted sulfamoyl group, an amide group, a sulfonamide group and an alkylsulfonyl group.

The alkyl group may have a branched structure. The alkyl group has preferably 1 to 20, more preferably 1 to 15, further preferably 1 to 10 and most preferably 1 to 6 carbon atoms.

The cycloalkyl group is preferably cyclohexyl.

The alkoxy group may have a branched structure. The alkoxy group has preferably 1 to 20, more preferably 1 to 15, further preferably 1 to 10 and most preferably 1 to 6 carbon atoms.

The alkylthio group may have a branched structure. The alkylthio group has preferably 1 to 20, more preferably 1 to 15, further preferably 1 to 10 and most preferably 1 to 6 carbon atoms.

The acyl group has preferably 2 to 20, more preferably 2 to 15, further preferably 2 to 10 and most preferably 2 to 6 carbon atoms.

The acyloxy group has preferably 2 to 20, more preferably 2 to 15, further preferably 2 to 10 and most preferably 2 to 6 carbon atoms.

The alkyl-substituted carbamoyl group has preferably 2 to 20, more preferably 2 to 15, further preferably 2 to 10 and most preferably 2 to 6 carbon atoms. The alkyl moiety may be further substituted with a substituent group (e.g., an alkoxy group).

The alkyl-substituted sulfamoyl group has preferably 2 to 20, more preferably 2 to 15, further preferably 2 to 10 and most preferably 2 to 6 carbon atoms. The alkyl moiety may be further substituted with a substituent group (e.g., an alkoxy group).

The amide group has preferably 2 to 20, more preferably 2 to 15, further preferably 2 to 10 and most preferably 2 to 6 carbon atoms.

The sulfonamide group has preferably 1 to 20, more preferably 1 to 15, further preferably 1 to 10 and most preferably 1 to 6 carbon atoms.

The alkylsulfonyl group has preferably 1 to 20, more preferably 1 to 15, further preferably 1 to 10 and most preferably 1 to 6 carbon atoms. The alkyl moiety may be. substituted with a substituent group (e.g., an alkoxy group).

The polymerizable group can be introduced into the repeating unit of the formula (II) having a hydrocarbon group. Preferably, the polymerizable group is introduced as a substituent group of the hydrocarbon group, and more preferably as a substituent group at the terminal hydrocarbon or fluorine-substituted hydrocarbon group.

The polymerizable group is attached to the hydrocarbon group preferably not directly but through a linking group.

Examples of the linking group include —O—, —CO—, —O—CO—, —CO—O—, —O—CO—O—, —CO—NH—, —SO$_2$—NH—, —NH—CO—, —NH—CO—O—, —NH—SO$_2$—, -alkylene-, -alkenylene-, -alkynylene-, —O-alkylene- and -alkylene-O—. In each of these linking groups, the left side is attached to the hydrocarbon group, and the right side is attached to the polymerizable group.

The alkylene group may have a branched or cyclic structure. The alkylene group has preferably 1 to 30, more preferably 1 to 20, further preferably 1 to 15 and most preferably 1 to 12 carbon atoms.

The alkenylene or alkynylene group may have a branched or cyclic structure. The alkenylene or alkynylene group has preferably 2 to 30, more preferably 2 to 20, further preferably 2 to 15 and most preferably 2 to 12 carbon atoms.

The hydrocarbon group may have two or more polymerizable groups.

A strongly hydrophilic group may be introduced in to the denatured polyvinyl alcohol, and thereby the orientation layer can be formed from an aqueous solution. In contrast, without introducing a strongly hydrophilic group, the orientation layer of the (meth)acrylic copolymer can be formed from an aqueous solution because carboxylic group (—COOM) functions as a strongly hydrophilic group.

The strongly hydrophilic group may be introduced as a repeating unit having the hydrophilic group or as a substituent group of the repeating unit having The hydrocarbon group. The term "strongly hydrophilic group" means a group more hydrophilic than hydroxyl group of polyvinyl alcohol. Generally, a denatured polyvinyl alcohol having, instead of a repeating unit derived from vinyl alcohol (normal repeating unit), a repeating unit having a more hydrophilic group than hydroxyl group of polyvinyl alcohol (strongly hydrophilic repeating unit) dissolves in water more than a denatured polyvinyl alcohol having the normal repeating unit instead of the strongly hydrophilic repeating unit. Examples of the strongly hydrophilic group include an anionic group (e.g., carboxyl, sulfo), a cationic group (e.g., ammonium, amino, an amide group, a sulfonamide group, a hydrazide group, a hydrazino group, carbamoyl, sulfamoyl) and a nonionic group (e.g., a group comprising polyethylene glycol).

The denatured polyvinyl alcohol or (meth)acrylic copolymer has a polymerization degree of preferably 200 to 5,000, and more preferably 300 to 3,000. The denatured polyvinyl alcohol or (meth)acrylic copolymer also has a molecular weight of preferably 9.000 to 200.000, and more preferably 13,000 to 130,000. Two or more kinds of denatured polyvinyl alcohols or (meth)acrylic copolymers can be used in combination.

The denatured polyvinyl alcohol or (meth)acrylic copolymer can be cross-linked.

The cross-linking reaction is preferably conducted with a cross-linking agent after or while a coating solution for orientation layer is applied. Examples of the cross-linking agent include methylolphenol resins, amino resins (e.g., a resin prepared by addition polymerization between melamine, benzoguanamine or urea and formaldehyde or alcohol), amine compounds, triazine compounds, isocyanate compounds, epoxy compounds, metal oxides, metal halides, organic metal halides, organic acid salts, metal alkoxides and compounds containing oxazoline groups.

The amount of the cross-linking agent is in the range of preferably 0.1 to 20 wt. %, more preferably 0.5 to 15 wt. % based on the amount of applied coating solution. The amount of non-reacted cross-linking agent remaining in the orientation layer is preferably not more than 1.0 wt. %, more preferably not more than 0.5 wt. % based on the amount of applied coating solution.

[Optically Anisotropic Layer]

The optically anisotropic layer has a refractive anisotropy in the range of 0.065 to 0.16, and preferably 0.090 to 0.16.

The refractive anisotropy ($\Delta n$) is defined by the following formula:

$$\Delta n = nx - ny$$

In the formula, $\Delta n$ is a refractive anisotropy of the optically anisotropic layer; nx is the maximum refractive index in the optically anisotropic layer; and ny is the minimum refractive index in the optically anisotropic layer.

In the present invention, the optically anisotropic layer is formed from discotic liquid crystal molecules represented by the formula (I).

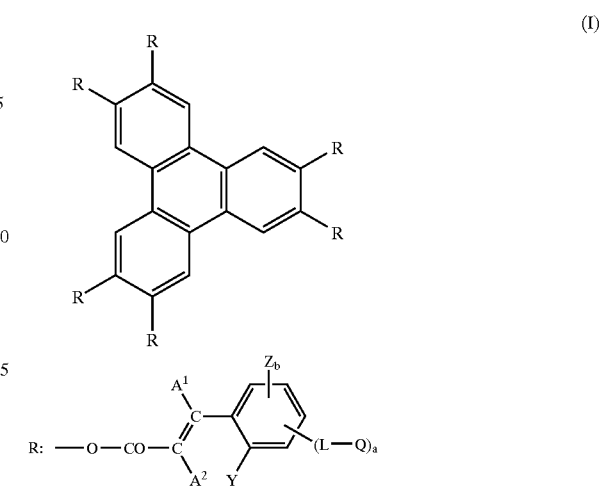

In the formula (I), each of $A^1$ and $A^2$ is independently hydrogen, a halogen atom (F, Cl, Br), an alkyl group having 1 to 12 carbon atoms or an alkoxy group having 1 to 12 carbon atoms. Preferably, each of $A^1$ and $A^2$ is independently hydrogen, an alkyl group having 1 to 6 carbon atoms or an alkoxy group having 1 to 6 carbon atoms, more preferably hydrogen, an alkyl group having 1 to 3 carbon atoms or an alkoxy group having 1 to 3 carbon atoms, and most preferably hydrogen, methyl, ethyl or methoxy.

In the formula (I), Y is hydrogen, a halogen atom (F, Cl, Br), an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms. Y is preferably hydrogen, a halogen atom, an alkyl group having 1 to 12 carbon atoms or an alkoxy group having 1 to 12 carbon atoms, more preferably hydrogen, an alkyl group having 1 to 6 carbon atoms or an alkoxy group having 1 to 6 carbon atoms, further preferably hydrogen, a halogen atom, an alkyl group having 1 to 3 carbon atoms or an alkoxy group having 1 to 3 carbon atoms, and most preferably hydrogen, methyl, ethyl or methoxy.

In the formula (I), Y may connect with $A^2$ to form a five- or six-membered ring. Examples of the five- or six-membered ring include cycloheptadiene ring and cyclohexadiene ring. As shown in the formula (I), the carbon-carbon double bond makes a trans-form.

In the formula (I), Z is a halogen atom (F, Cl, Br), an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms.

The alkyl group preferably has 1 to 8 carbon atoms. Examples of the alkyl group include methyl, ethyl, n-propyl, n-pentyl and n-heptyl.

Examples of the alkoxy group include methoxy and 2-methoxyethyl.

Examples of the acyl group include acetyl.

Examples of the alkylamino group include methylamino, ethylamino and dimethylamino.

Examples of the acyloxy group include acetyloxy and acryloyloxy.

Z is preferably an alkyl group having 1 to 12 carbon atoms, more preferably an alkyl group having 1 to 8 carbon atoms, further preferably an alkyl group having 1 to 4 carbon atoms, and most preferably methyl.

In the formula (I), L is a divalent linking group selected from the group consisting of —O—, —CO—, —S—, —NH—, an alkylene group, an alkenylene group, an alkynylene group, an arylene group and a combination thereof.

L is preferably a group formed by combination of at least two divalent groups selected from the group consisting of —O—, —CO—, —S—, —NH—, an alkylene group, an alkenylene group, an alkynylene group and an arylene group; more preferably a group formed by combination of at least two divalent groups selected from the group consisting of —O—, —CO—, an alkylene group, an alkenylene group, an alkynylene group and an arylene group; further preferably a group formed by combination of at least two divalent groups selected from the group consisting of —O—, —CO—, an alkylene group, an alkenylene group and an alkynylene group; and most preferably a group formed by combination of at least two divalent groups selected from the group consisting of —O—, —CO— and an alkylene group.

The alkylene group preferably has 1 to 12 carbon atoms.

The alkenylene or alkynylene group preferably has 2 to 12 carbon atoms.

The arylene group preferably has 6 to 10 carbon atoms.

The alkylene, alkenylene, alkynylene or arylene group may have a substituent group (e.g., alkyl group, halogen atom, cyano, alkoxy group, acyloxy group).

Examples of the divalent linking groups (L) are shown below. In the examples, the left side is attached to a carbon atom as a substituent group of the benzene ring in the formula (II), and the right side is attached to the polymerizable group (Q) described after. The AL means an alkylene group, an alkenylene group or an alkynylene group. The AR means an arylene group. The n means an integer of 2 to 15.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L5: —CO—AR—O—AL—O—
L5: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—
L26: —O—
L27: —(O—AL)n—
L28: —(O—AL)n—O—
L29: —(O—AL)n—O—CO—
L30: —AL—
L31: —AL—O—
L32: —AL—O—CO—
L33: —O—AL—CO—O—AL—
L34: —O—AL—CO—O—AL—O—
L35: —O—AL—CO—O—AL—O—CO—
L36: —O—AL—CO—AL—
L37: —O—AL—CO—AL—O—
L38: —O—AL—CO—AL—O—CO—

The discotic liquid crystal molecules can be spirally twisted by introducing an asymmetric carbon atom into AL (an alkylene group, an alkenylene group or an alkynylene group). Examples of AL containing asymmetric carbon atoms (AL*) are shown below. In the examples, the left side is adjacent to triphenylene ring, and the right side is adjacent to the polymerizable group (Q). The carbon atom (C) with the mark (*) is the asymmetric carbon atom. The optical activity can be either S or R.

AL*1: —CH$_2$CH$_2$—C*HCH$_3$—CH$_2$CH$_2$CH$_2$—
AL*2: —CH$_2$CH$_2$CH$_2$—C*HCH$_3$—CH$_2$CH$_2$—
AL*3: —CH$_2$—C*HCH$_3$—CH$_2$CH$_2$CH$_2$CH$_2$—
AL*4: —C*HCH$_3$—CH$_2$CH$_2$CH$_2$CH$_2$CH$_2$—
AL*5: —CH$_2$CH$_2$CH$_2$CH$_2$—C*HCH$_3$—CH$_2$—
AL*6: —CH$_2$CH$_2$CH$_2$CH$_2$CH$_2$—C*HCH$_3$—
AL*7: —C*HCH$_3$—CH$_2$CH$_2$CH$_2$CH$_2$—
AL*8: —CH$_2$—C*HCH$_3$—CH$_2$CH$_2$CH$_2$—
AL*9: —CH$_2$CH$_2$—C*HCH$_3$—CH$_2$CH$_2$—
AL*10: —CH$_2$CH$_2$CH$_2$—C*HCH$_3$—CH$_2$—
AL*11: —CH$_2$CH$_2$CH$_2$CH$_2$—C*HCH$_3$—
AL*12: —C*HCH$_3$—CH$_2$CH$_2$CH$_2$—
AL*13: —CH$_2$—C*HCH$_3$—CH$_2$CH$_2$—
AL*14: —CH$_2$CH$_2$—C*HCH$_3$—CH$_2$—
AL*15: —CH$_2$CH$_2$CH$_2$—C*HCH$_3$—
AL*16: —CH$_2$—C*HCH$_3$—
AL*17: —C*HCH$_3$—CH$_2$—
AL*18: C*HCH$_3$—CH$_2$CH$_2$CH$_2$CH$_2$CH$_2$CH$_2$—
AL*19: —CH$_2$—C*HCH$_3$—CH$_2$CH$_2$CH$_2$CH$_2$CH$_2$—
AL*20: —CH$_2$CH$_2$—C*HCH$_3$—CH$_2$CH$_2$CH$_2$CH$_2$—
AL*21: —CH$_2$CH$_2$CH$_2$—C*HCH$_3$—CH$_2$CH$_2$CH$_2$—
AL*22: —C*HCH$_3$—CH$_2$CH$_2$CH$_2$CH$_2$CH$_2$CH$_2$CH$_2$—
AL*23: —CH$_2$—C*HCH$_3$—CH$_2$CH$_2$CH$_2$CH$_2$CH$_2$CH$_2$—
AL*24: —CH$_2$CH$_2$—C*HCH$_3$—CH$_2$CH$_2$CH$_2$CH$_2$CH$_2$—
AL*25: —CH$_2$CH$_2$CH$_2$—C*HCH$_3$—CH$_2$CH$_2$CH$_2$CH$_2$—
AL*26: —C*HCH$_3$—CH$_2$CH$_2$CH$_2$CH$_2$CH$_2$CH$_2$CH$_2$CH$_2$—
AL*27: —CH$_2$—C*HCH$_3$—CH$_2$CH$_2$CH$_2$CH$_2$CH$_2$CH$_2$CH$_2$CH$_2$—
AL*28: —CH$_2$—C*HCH$_2$CH$_3$—
AL*29: —CH$_2$—C*HCH$_2$CH$_3$—CH$_2$—
AL*30: —CH$_2$—C*HCH$_2$CH$_3$—CH$_2$CH$_2$—
AL*31: —CH$_2$—C*HCH$_2$CH$_3$—CH$_2$CH$_2$CH$_2$CH$_2$—
AL*32: —CH$_2$—C*H (n—C$_3$H$_7$)—CH$_2$CH$_2$—
AL*33: —CH$_2$—C*H(n—C$_3$H$_7$)—CH$_2$CH$_2$CH$_2$CH$_2$—
AL*34: —CH$_2$—C*H(OCOCH$_3$)—CH$_2$CH$_2$—
AL*35: —CH$_2$—C*H(OCOCH$_3$)—CH$_2$CH$_2$CH$_2$CH$_2$—
AL*36: —CH$_2$—C*HF—CH$_2$CH$_2$—
AL*37: —CH$_2$—C*HF—CH$_2$CH$_2$CH$_2$CH$_2$—

AL*38: —CH₂—C*HCl—CH₂CH₂—
AL*39: —CH₂—C*HCl—CH₂CH₂CH₂CH₂—
AL*40: —CH₂—C*HOCH₃—CH₂CH₂—
AL*41: —CH₂—C*HOCH₃—CH₂CH₂CH₂CH₂—
AL*42: —CH₂—C*HCN—CH₂CH₂—
AL*43: —CH₂—C*HCN—CH₂CH₂CH₂CH₂—
AL*44: —CH₂—C*HCF₃—CH₂CH₂—
AL*45: —CH₂—C*HCF₃—CH₂CH₂CH₂CH₂—

In the formula (I), Q is a polymerizable group. Examples of the polymerizable groups (Q) are shown below.

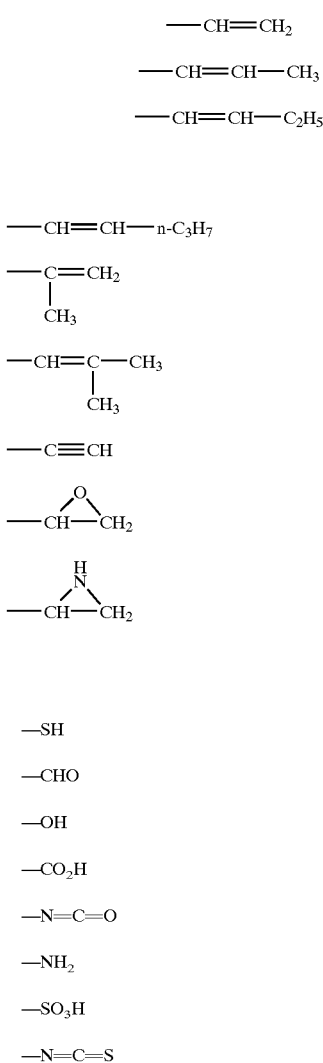

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula (I), a is an integer of 1, 2, 3 or 4, preferably 1, 2 or 3, more preferably 1 or 2, and most preferably 1. When a is 2 or more, plural combinations of L and Q are preferably the same.

In the formula (I), b is an integer of 0 to 4-a. Particularly preferably, b is 0.

Discotic liquid crystal molecules represented by the formula (Ia) are particularly preferred.

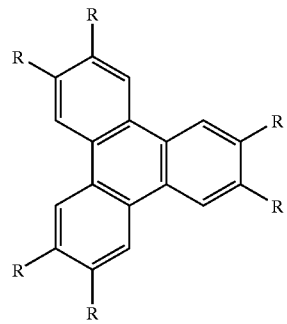

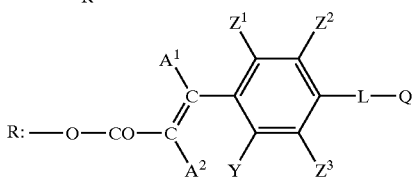

In the formula (Ia), each of $A^1$ and $A^2$ is independently hydrogen, a halogen atom, an alkyl group having 1 to 12 carbon atoms or an alkoxy group having 1 to 12 carbon atoms. The definitions and examples of these groups are the same as those described above for $A^1$ and $A^2$ in the formula (I).

In the formula (Ia), Y is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms. The definitions and examples of these groups are the same as those described above for Y in the formula (I).

In the formula (Ia), Y may connect with $A^2$ to form a five- or six-membered ring. Examples of the five- or six-membered ring are the same as those described above for Y in the formula (I).

In the formula (Ia), each of $Z^1$, $Z^2$ and $Z^3$ is independently hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms. The definitions and examples of these groups are the same as those described above for Z in the formula (I).

In the formula (Ia), L is a divalent linking group selected from the group consisting of —O—, —CO—, —S—, —NH—, an alkylene group, an alkenylene group, an alkynylene group, an arylene group and a combination thereof. The definitions and examples of these groups are the same as those described above for L in the formula (I).

In the formula (Ia), Q is a polymerizable group. The definition and examples of the polymerizable group are the same as those described above for Q in the formula (I).

Examples of the discotic liquid crystal molecules (DLC) represented by the formula (I) are given below. The examples (1) to (426) are shown by referring to $A^1$, $A^2$, Y, Z, $Z^2$, $Z^3$, L and Q in the formula (Ia).

In each example of (379) to (382), L having an asymmetric carbon atom (C*) is an (R)-body. In each example of (383) to (386), L having an asymmetric carbon atom (C*) is an (S)-body. In each example of (387) to (390), L having an asymmetric carbon atom (C*) is a racemic body.

| DLC: | A¹ | A² | Y | Z¹ | Z² | Z³ | L | Q |
|---|---|---|---|---|---|---|---|---|
| 1: | H | H | H | H | H | H | O | Q8 |
| 2: | H | H | H | H | H | H | $OCH_2$ | Q8 |
| 3: | H | H | H | H | H | H | $O(CH_2)_2$ | Q8 |
| 4: | H | H | H | H | H | H | $O(CH_2)_3$ | Q8 |
| 5: | H | H | H | H | H | H | $O(CH_2)_4$ | Q8 |
| 6: | H | H | H | H | H | H | $O(CH_2)_5$ | Q8 |
| 7: | H | H | H | H | H | H | $O(CH_2)_6$ | Q8 |
| 8: | H | H | H | H | H | H | $O(CH_2)_7$ | Q8 |
| 9: | H | H | H | H | H | H | $O(CH_2)_8$ | Q8 |
| 10: | H | H | H | H | H | H | $O(CH_2)_9$ | Q8 |
| 11: | H | H | H | H | H | H | $O(CH_2)_{10}$ | Q8 |
| 12: | H | H | H | H | H | H | $O(CH_2)_{11}$ | Q8 |
| 13: | H | H | H | H | H | H | $O(CH_2)_{12}$ | Q8 |
| 14: | H | H | H | H | H | H | $O(CH_2)_{13}$ | Q8 |
| 15: | H | H | H | H | H | H | $O(CH_2)_{14}$ | Q8 |
| 16: | H | H | H | H | H | H | $O(CH_2)_{15}$ | Q8 |
| 17: | H | H | H | H | H | H | $OCH_2OCO$ | Q1 |
| 18: | H | H | H | H | H | H | $O(CH_2)_2OCO$ | Q1 |
| 19: | H | H | H | H | H | H | $O(CH_2)_3OCO$ | Q1 |
| 20: | H | H | H | H | H | H | $O(CH_2)_4OCO$ | Q1 |
| 21: | H | H | H | H | H | H | $O(CH_2)_5OCO$ | Q1 |
| 22: | H | H | H | H | H | H | $O(CH_2)_6OCO$ | Q1 |
| 23: | H | H | H | H | H | H | $O(CH_2)_7OCO$ | Q1 |
| 24: | H | H | H | H | H | H | $O(CH_2)_8OCO$ | Q1 |
| 25: | H | H | H | H | H | H | $O(CH_2)_9OCO$ | Q1 |
| 26: | H | H | H | H | H | H | $O(CH_2)_{10}OCO$ | Q1 |
| 27: | H | H | H | H | H | H | $O(CH_2)_{11}OCO$ | Q1 |
| 28: | H | H | H | H | H | H | $O(CH_2)_{12}OCO$ | Q1 |
| 29: | H | H | H | H | H | H | $O(CH_2)_{13}OCO$ | Q1 |
| 30: | H | H | H | H | H | H | $O(CH_2)_{14}OCO$ | Q1 |
| 31: | H | H | H | H | H | H | $O(CH_2)_{15}OCO$ | Q1 |
| 32: | H | H | H | H | H | H | $OCH_2OCO$ | Q5 |
| 33: | H | H | H | H | H | H | $O(CH_2)_2OCO$ | Q5 |
| 34: | H | H | H | H | H | H | $O(CH_2)_3OCO$ | Q5 |
| 35: | H | H | H | H | H | H | $O(CH_2)_4OCO$ | Q5 |
| 36: | H | H | H | H | H | H | $O(CH_2)_5OCO$ | Q5 |
| 37: | H | H | H | H | H | H | $O(CH_2)_6OCO$ | Q5 |
| 38: | H | H | H | H | H | H | $O(CH_2)_7OCO$ | Q5 |
| 39: | H | H | H | H | H | H | $O(CH_2)_8OCO$ | Q5 |
| 40: | H | H | H | H | H | H | $O(CH_2)_9OCO$ | Q5 |
| 41: | H | H | H | H | H | H | $O(CH_2)_{10}OCO$ | Q5 |
| 42: | H | H | H | H | H | H | $O(CH_2)_{11}OCO$ | Q5 |
| 43: | H | H | H | H | H | H | $O(CH_2)_{12}OCO$ | Q5 |
| 44: | H | H | H | H | H | H | $O(CH_2)_{13}OCO$ | Q5 |
| 45: | H | H | H | H | H | H | $O(CH_2)_{14}OCO$ | Q5 |
| 46: | H | H | H | H | H | H | $O(CH_2)_{15}OCO$ | Q5 |
| 47: | H | H | H | H | H | H | $OCH_2O$ | Q1 |
| 48: | H | H | H | H | H | H | $O(CH_2)_2O$ | Q1 |
| 49: | H | H | H | H | H | H | $O(CH_2)_3O$ | Q1 |
| 50: | H | H | H | H | H | H | $O(CH_2)_4O$ | Q1 |
| 51: | H | H | H | H | H | H | $O(CH_2)_5O$ | Q1 |
| 52: | H | H | H | H | H | H | $O(CH_2)_6O$ | Q1 |
| 53: | H | H | H | H | H | H | $O(CH_2)_7O$ | Q1 |
| 54: | H | H | H | H | H | H | $O(CH_2)_8O$ | Q1 |
| 55: | H | H | H | H | H | H | $O(CH_2)_9O$ | Q1 |
| 56: | H | H | H | H | H | H | $O(CH_2)_{10}O$ | Q1 |
| 57: | H | H | H | H | H | H | $O(CH_2)_{11}O$ | Q1 |
| 58: | H | H | H | H | H | H | $O(CH_2)_{12}O$ | Q1 |
| 59: | H | H | H | H | H | H | $O(CH_2)_{13}O$ | Q1 |
| 60: | H | H | H | H | H | H | $O(CH_2)_{14}O$ | Q1 |
| 61: | H | H | H | H | H | H | $O(CH_2)_{15}O$ | Q1 |
| 62: | H | $CH_3$ | H | H | H | H | O | Q8 |
| 63: | H | $CH_3$ | H | H | H | H | $OCH_2$ | Q8 |
| 64: | H | $CH_3$ | H | H | H | H | $O(CH_2)_2$ | Q8 |
| 65: | H | $CH_3$ | H | H | H | H | $O(CH_2)_3$ | Q8 |
| 66: | H | $CH_3$ | H | H | H | H | $O(CH_2)_4$ | Q8 |
| 67: | H | $CH_3$ | H | H | H | H | $O(CH_2)_5$ | Q8 |
| 68: | H | $CH_3$ | H | H | H | H | $O(CH_2)_6$ | Q8 |
| 69: | H | $CH_3$ | H | H | H | H | $O(CH_2)_7$ | Q8 |
| 70: | H | $CH_3$ | H | H | H | H | $O(CH_2)_8$ | Q8 |
| 71: | H | $CH_3$ | H | H | H | H | $O(CH_2)_9$ | Q8 |
| 72: | H | $CH_3$ | H | H | H | H | $O(CH_2)_{10}$ | Q8 |
| 73: | H | $CH_3$ | H | H | H | H | $O(CH_2)_{11}$ | Q8 |
| 74: | H | $CH_3$ | H | H | H | H | $O(CH_2)_{12}$ | Q8 |
| 75: | H | $CH_3$ | H | H | H | H | $OCH_2OCO$ | Q1 |
| 76: | H | $CH_3$ | H | H | H | H | $O(CH_2)_2OCO$ | Q1 |
| 77: | H | $CH_3$ | H | H | H | H | $O(CH_2)_3OCO$ | Q1 |

-continued

| DLC: | A$^1$ | A$^2$ | Y | Z$^1$ | Z$^2$ | Z$^3$ | L | Q |
|---|---|---|---|---|---|---|---|---|
| 78: | H | CH$_3$ | H | H | H | H | O(CH$_2$)$_4$OCO | Q1 |
| 79: | H | CH$_3$ | H | H | H | H | O(CH$_2$)$_5$OCO | Q1 |
| 80: | H | CH$_3$ | H | H | H | H | O(CH$_2$)$_6$OCO | Q1 |
| 81: | H | CH$_3$ | H | H | H | H | O(CH$_2$)$_7$OCO | Q1 |
| 82: | H | CH$_3$ | H | H | H | H | O(CH$_2$)$_8$OCO | Q1 |
| 83: | H | CH$_3$ | H | H | H | H | O(CH$_2$)$_9$OCO | Q1 |
| 84: | H | CH$_3$ | H | H | H | H | O(CH$_2$)$_{10}$OCO | Q1 |
| 85: | H | CH$_3$ | H | H | H | H | O(CH$_2$)$_{11}$OCO | Q1 |
| 86: | H | CH$_3$ | H | H | H | H | O(CH$_2$)$_{12}$OCO | Q1 |
| 87: | H | CH$_3$ | H | H | H | H | OCH$_2$OCO | Q5 |
| 88: | H | CH$_3$ | H | H | H | H | O(CH$_2$)$_2$OCO | Q5 |
| 89: | H | CH$_3$ | H | H | H | H | O(CH$_2$)$_3$OCO | Q5 |
| 90: | H | CH$_3$ | H | H | H | H | O(CH$_2$)$_4$OCO | Q5 |
| 91: | H | CH$_3$ | H | H | H | H | O(CH$_2$)$_5$OCO | Q5 |
| 92: | H | CH$_3$ | H | H | H | H | O(CH$_2$)$_6$OCO | Q5 |
| 93: | H | CH$_3$ | H | H | H | H | O(CH$_2$)$_7$OCO | Q5 |
| 94: | H | CH$_3$ | H | H | H | H | O(CH$_2$)$_8$OCO | Q5 |
| 95: | H | CH$_3$ | H | H | H | H | O(CH$_2$)$_9$OCO | Q5 |
| 96: | H | CH$_3$ | H | H | H | H | O(CH$_2$)$_{10}$OCO | Q5 |
| 97: | H | CH$_3$ | H | H | H | H | O(CH$_2$)$_{11}$OCO | Q5 |
| 98: | H | CH$_3$ | H | H | H | H | O(CH$_2$)$_{12}$OCO | Q5 |
| 99: | H | CH$_3$ | H | H | H | H | OCH$_2$O | Q1 |
| 100: | H | CH$_3$ | H | H | H | H | O(CH$_2$)$_2$O | Q1 |
| 101: | H | CH$_3$ | H | H | H | H | O(CH$_2$)$_3$O | Q1 |
| 102: | H | CH$_3$ | H | H | H | H | O(CH$_2$)$_4$O | Q1 |
| 103: | H | CH$_3$ | H | H | H | H | O(CH$_2$)$_5$O | Q1 |
| 104: | H | CH$_3$ | H | H | H | H | O(CH$_2$)$_6$O | Q1 |
| 105: | H | CH$_3$ | H | H | H | H | O(CH$_2$)$_7$O | Q1 |
| 106: | H | CH$_3$ | H | H | H | H | O(CH$_2$)$_8$O | Q1 |
| 107: | H | CH$_3$ | H | H | H | H | O(CH$_2$)$_9$O | Q1 |
| 108: | H | CH$_3$ | H | H | H | H | O(CH$_2$)$_{10}$O | Q1 |
| 109: | H | CH$_3$ | H | H | H | H | O(CH$_2$)$_{11}$O | Q1 |
| 110: | H | CH$_3$ | H | H | H | H | O(CH$_2$)$_{12}$O | Q1 |
| 111: | CH$_3$ | H | H | H | H | H | O | Q8 |
| 112: | CH$_3$ | H | H | H | H | H | OCH$_2$ | Q8 |
| 113: | CH$_3$ | H | H | H | H | H | O(CH$_2$)$_2$ | Q8 |
| 114: | CH$_3$ | H | H | H | H | H | O(CH$_2$)$_3$ | Q8 |
| 115: | CH$_3$ | H | H | H | H | H | O(CH$_2$)$_4$ | Q8 |
| 116: | CH$_3$ | H | H | H | H | H | O(CH$_2$)$_5$ | Q8 |
| 117: | CH$_3$ | H | H | H | H | H | O(CH$_2$)$_6$ | Q8 |
| 118: | CH$_3$ | H | H | H | H | H | O(CH$_2$)$_7$ | Q8 |
| 119: | CH$_3$ | H | H | H | H | H | O(CH$_2$)$_8$ | Q8 |
| 120: | CH$_3$ | H | H | H | H | H | O(CH$_2$)$_9$ | Q8 |
| 121: | CH$_3$ | H | H | H | H | H | O(CH$_2$)$_{10}$ | Q8 |
| 122: | CH$_3$ | H | H | H | H | H | O(CH$_2$)$_{11}$ | Q8 |
| 123: | CH$_3$ | H | H | H | H | H | O(CH$_2$)$_{12}$ | Q8 |
| 124: | CH$_3$ | H | H | H | H | H | OCH$_2$OCO | Q1 |
| 125: | CH$_3$ | H | H | H | H | H | O(CH$_2$)$_2$OCO | Q1 |
| 126: | CH$_3$ | H | H | H | H | H | O(CH$_2$)$_3$OCO | Q1 |
| 127: | CH$_3$ | H | H | H | H | H | O(CH$_2$)$_4$OCO | Q1 |
| 128: | CH$_3$ | H | H | H | H | H | O(CH$_2$)$_5$OCO | Q1 |
| 129: | CH$_3$ | H | H | H | H | H | O(CH$_2$)$_6$OCO | Q1 |
| 130: | CH$_3$ | H | H | H | H | H | O(CH$_2$)$_7$OCO | Q1 |
| 131: | CH$_3$ | H | H | H | H | H | O(CH$_2$)$_8$OCO | Q1 |
| 132: | CH$_3$ | H | H | H | H | H | O(CH$_2$)$_9$OCO | Q1 |
| 133: | CH$_3$ | H | H | H | H | H | O(CH$_2$)$_{10}$OCO | Q1 |
| 134: | CH$_3$ | H | H | H | H | H | O(CH$_2$)$_{11}$OCO | Q1 |
| 135: | CH$_3$ | H | H | H | H | H | O(CH$_2$)$_{12}$OCO | Q1 |
| 136: | CH$_3$ | H | H | H | H | H | OCH$_2$OCO | Q5 |
| 137: | CH$_3$ | H | H | H | H | H | O(CH$_2$)$_2$OCO | Q5 |
| 138: | CH$_3$ | H | H | H | H | H | O(CH$_2$)$_3$OCO | Q5 |
| 139: | CH$_3$ | H | H | H | H | H | O(CH$_2$)$_4$OCO | Q5 |
| 140: | CH$_3$ | H | H | H | H | H | O(CH$_2$)$_5$OCO | Q5 |
| 141: | CH$_3$ | H | H | H | H | H | O(CH$_2$)$_6$OCO | Q5 |
| 142: | CH$_3$ | H | H | H | H | H | O(CH$_2$)$_7$OCO | Q5 |
| 143: | CH$_3$ | H | H | H | H | H | O(CH$_2$)$_8$OCO | Q5 |
| 144: | CH$_3$ | H | H | H | H | H | O(CH$_2$)$_9$OCO | Q5 |
| 145: | CH$_3$ | H | H | H | H | H | O(CH$_2$)$_{10}$OCO | Q5 |
| 146: | CH$_3$ | H | H | H | H | H | O(CH$_2$)$_{11}$OCO | Q5 |
| 147: | CH$_3$ | H | H | H | H | H | O(CH$_2$)$_{12}$OCO | Q5 |
| 148: | CH$_3$ | H | H | H | H | H | OCH$_2$O | Q1 |
| 149: | CH$_3$ | H | H | H | H | H | O(CH$_2$)$_2$O | Q1 |
| 150: | CH$_3$ | H | H | H | H | H | O(CH$_2$)$_3$O | Q1 |
| 151: | CH$_3$ | H | H | H | H | H | O(CH$_2$)$_4$O | Q1 |
| 152: | CH$_3$ | H | H | H | H | H | O(CH$_2$)$_5$O | Q1 |
| 153: | CH$_3$ | H | H | H | H | H | O(CH$_2$)$_6$O | Q1 |
| 154: | CH$_3$ | H | H | H | H | H | O(CH$_2$)$_7$O | Q1 |

-continued

| DLC: | A¹ | A² | Y | Z¹ | Z² | Z³ | L | Q |
|---|---|---|---|---|---|---|---|---|
| 155: | $CH_3$ | H | H | H | H | H | $O(CH_2)_8O$ | Q1 |
| 156: | $CH_3$ | H | H | H | H | H | $O(CH_2)_9O$ | Q1 |
| 157: | $CH_3$ | H | H | H | H | H | $O(CH_2)_{10}O$ | Q1 |
| 158: | $CH_3$ | H | H | H | H | W | $O(CH_2)_{11}O$ | Q1 |
| 159: | $CH_3$ | H | H | H | H | H | $O(CH_2)_{12}O$ | Q1 |
| 160: | $CH_3$ | $CH_3$ | H | H | H | H | O | Q8 |
| 161: | $CH_3$ | $CH_3$ | H | H | H | H | $OCH_2$ | Q8 |
| 162: | $CH_3$ | $CH_3$ | H | H | H | H | $O(CH_2)_2$ | Q8 |
| 163: | $CH_3$ | $CH_3$ | H | H | H | H | $O(CH_2)_3$ | Q8 |
| 164: | $CH_3$ | $CH_3$ | H | H | H | H | $O(CH_2)_4$ | Q8 |
| 165: | $CH_3$ | $CH_3$ | H | H | H | H | $O(CH_2)_5$ | Q8 |
| 166: | $CH_3$ | $CH_3$ | H | H | H | H | $O(CH_2)_6$ | Q8 |
| 167: | $CH_3$ | $CH_3$ | H | H | H | H | $O(CH_2)_7$ | Q8 |
| 168: | $CH_3$ | $CH_3$ | H | H | H | H | $O(CH_2)_8$ | Q8 |
| 169: | $CH_3$ | $CH_3$ | H | H | H | H | $O(CH_2)_9$ | Q8 |
| 170: | $CH_3$ | $CH_3$ | H | H | H | H | $O(CH_2)_{10}$ | Q8 |
| 171: | $CH_3$ | $CH_3$ | H | H | H | H | $O(CH_2)_{11}$ | Q8 |
| 172: | $CH_3$ | $CH_3$ | H | H | H | H | $O(CH_2)_{12}$ | Q8 |
| 173: | $CH_3$ | $CH_3$ | H | H | H | H | $OCH_2OCO$ | Q1 |
| 174: | $CH_3$ | $CH_3$ | H | H | H | H | $O(CH_2)_2OCO$ | Q1 |
| 175: | $CH_3$ | $CH_3$ | H | H | H | H | $O(CH_2)_3OCO$ | Q1 |
| 176: | $CH_3$ | $CH_3$ | H | H | H | H | $O(CH_2)_4OCO$ | Q1 |
| 177: | $CH_3$ | $CH_3$ | H | H | H | H | $O(CH_2)_5OCO$ | Q1 |
| 178: | $CH_3$ | $CH_3$ | H | H | H | H | $O(CH_2)_6OCO$ | Q1 |
| 179: | $CH_3$ | $CH_3$ | H | H | H | H | $O(CH_2)_7OCO$ | Q1 |
| 180: | $CH_3$ | $CH_3$ | H | H | H | H | $O(CH_2)_8OCO$ | Q1 |
| 181: | $CH_3$ | $CH_3$ | H | H | H | H | $O(CH_2)_9OCO$ | Q1 |
| 182: | $CH_3$ | $CH_3$ | H | H | H | H | $O(CH_2)_{10}OCO$ | Q1 |
| 183: | $CH_3$ | $CH_3$ | H | H | H | H | $O(CH_2)_{11}OCO$ | Q1 |
| 184: | $CH_3$ | $CH_3$ | H | H | H | H | $O(CH_2)_{12}OCO$ | Q1 |
| 185: | $CH_3$ | $CH_3$ | H | H | H | H | $OCH_2OCO$ | Q5 |
| 186: | $CH_3$ | $CH_3$ | H | H | H | H | $O(CH_2)_2OCO$ | Q5 |
| 187: | $CH_3$ | $CH_3$ | H | H | H | H | $O(CH_2)_3OCO$ | Q5 |
| 188: | $CH_3$ | $CH_3$ | H | H | H | H | $O(CH_2)_4OCO$ | Q5 |
| 189: | $CH_3$ | $CH_3$ | H | H | H | H | $O(CH_2)_5OCO$ | Q5 |
| 190: | $CH_3$ | $CH_3$ | H | H | H | H | $O(CH_2)_6OCO$ | Q5 |
| 191: | $CH_3$ | $CH_3$ | H | H | H | H | $O(CH_2)_7OCO$ | Q5 |
| 192: | $CH_3$ | $CH_3$ | H | H | H | H | $O(CH_2)_8OCO$ | Q5 |
| 193: | $CH_3$ | $CH_3$ | H | H | H | H | $O(CH_2)_9OCO$ | Q5 |
| 194: | $CH_3$ | $CH_3$ | H | H | H | H | $O(CH_2)_{10}OCO$ | Q5 |
| 195: | $CH_3$ | $CH_3$ | H | H | H | H | $O(CH_2)_{11}OCO$ | Q5 |
| 196: | $CH_3$ | $CH_3$ | H | H | H | H | $O(CH_2)_{12}OCO$ | Q5 |
| 197: | $CH_3$ | $CH_3$ | H | H | H | H | $OCH_2O$ | Q1 |
| 198: | $CH_3$ | $CH_3$ | H | H | H | H | $O(CH_2)_2O$ | Q1 |
| 199: | $CH_3$ | $CH_3$ | H | H | H | H | $O(CH_2)_3O$ | Q1 |
| 200: | $CH_3$ | $CH_3$ | H | H | H | H | $O(CH_2)_4O$ | Q1 |
| 201: | $CH_3$ | $CH_3$ | H | H | H | H | $O(CH_2)_5O$ | Q1 |
| 202: | $CH_3$ | $CH_3$ | H | H | H | H | $O(CH_2)_6O$ | Q1 |
| 203: | $CH_3$ | $CH_3$ | H | H | H | H | $O(CH_2)_7O$ | Q1 |
| 204: | $CH_3$ | $CH_3$ | H | H | H | H | $O(CH_2)_8O$ | Q1 |
| 205: | $CH_3$ | $CH_3$ | H | H | H | H | $O(CH_2)_9O$ | Q1 |
| 206: | $CH_3$ | $CH_3$ | H | H | H | H | $O(CH_2)_{10}O$ | Q1 |
| 207: | $CH_3$ | $CH_3$ | H | H | H | H | $O(CH_2)_{11}O$ | Q1 |
| 208: | $CH_3$ | $CH_3$ | H | H | H | H | $O(CH_2)_{12}O$ | Q1 |
| 209: | H | H | H | $CH_3$ | H | H | O | Q8 |
| 210: | H | H | H | $CH_3$ | H | H | $OCH_2$ | Q8 |
| 211: | H | H | H | $CH_3$ | H | H | $O(CH_2)_2$ | Q8 |
| 212: | H | H | H | $CH_3$ | H | H | $O(CH_2)_3$ | Q8 |
| 213: | H | H | H | $CH_3$ | H | H | $O(CH_2)_4$ | Q8 |
| 214: | H | H | H | $CH_3$ | H | H | $O(CH_2)_5$ | Q8 |
| 215: | H | H | H | $CH_3$ | H | H | $O(CH_2)_6$ | Q8 |
| 216: | H | H | H | $CH_3$ | H | H | $O(CH_2)_7$ | Q8 |
| 217: | H | H | H | $CH_3$ | H | H | $O(CH_2)_8$ | Q8 |
| 218: | H | H | H | $CH_3$ | H | H | $O(CH_2)_9$ | Q8 |
| 219: | H | H | H | $CH_3$ | H | H | $O(CH_2)_{10}$ | Q8 |
| 220: | H | H | H | $CH_3$ | H | H | $O(CH_2)_{11}$ | Q8 |
| 221: | H | H | H | $CH_3$ | H | H | $O(CH_2)_{12}$ | Q8 |
| 222: | H | H | H | $CH_3$ | H | H | $OCH_2OCO$ | Q1 |
| 223: | H | H | H | $CH_3$ | H | H | $O(CH_2)_2OCO$ | Q1 |
| 224: | H | H | H | $CH_3$ | H | H | $O(CH_2)_3OCO$ | Q1 |
| 225: | H | H | H | $CH_3$ | H | H | $O(CH_2)_4OCO$ | Q1 |
| 226: | H | H | H | $CH_3$ | H | H | $O(CH_2)_5OCO$ | Q1 |
| 227: | H | H | H | $CH_3$ | H | H | $O(CH_2)_6OCO$ | Q1 |
| 228: | H | H | H | $CH_3$ | H | H | $O(CH_2)_7OCO$ | Q1 |
| 229: | H | H | H | $CH_3$ | H | H | $O(CH_2)_8OCO$ | Q1 |
| 230: | H | H | H | $CH_3$ | H | H | $O(CH_2)_9OCO$ | Q1 |
| 231: | H | H | H | $CH_3$ | H | H | $O(CH_2)_{10}OCO$ | Q1 |

-continued

| DLC: | A$^1$ | A$^2$ | Y | Z$^1$ | Z$^2$ | Z$^3$ | L | Q |
|---|---|---|---|---|---|---|---|---|
| 232: | H | H | H | CH$_3$ | H | H | O(CH$_2$)$_{11}$OCO | Q1 |
| 233: | H | H | H | CH$_3$ | H | H | O(CH$_2$)$_{12}$OCO | Q1 |
| 234: | H | H | H | CH$_3$ | H | H | OCH$_2$OCO | Q5 |
| 235: | H | H | H | CH$_3$ | H | H | O(CH$_2$)$_2$OCO | Q5 |
| 236: | H | H | H | CH$_3$ | H | H | O(CH$_2$)$_3$OCO | Q5 |
| 237: | H | H | H | CH$_3$ | H | H | O(CH$_2$)$_4$OCO | Q5 |
| 238: | H | H | H | CH$_3$ | H | H | O(CH$_2$)$_5$OCO | Q5 |
| 239: | H | H | H | CH$_3$ | H | H | O(CH$_2$)$_6$OCO | Q5 |
| 240: | H | H | H | CH$_3$ | H | H | O(CH$_2$)$_7$OCO | Q5 |
| 241: | H | H | H | CH$_3$ | H | H | O(CH$_2$)$_8$OCO | Q5 |
| 242: | H | H | H | CH$_3$ | H | H | O(CH$_2$)$_9$OCO | Q5 |
| 243: | H | H | H | CH$_3$ | H | H | O(CH$_2$)$_{10}$OCO | Q5 |
| 244: | H | H | H | CH$_3$ | H | H | O(CH$_2$)$_{11}$OCO | Q5 |
| 245: | H | H | H | CH$_3$ | H | H | O(CH$_2$)$_{12}$OCO | Q5 |
| 246: | H | H | H | CH$_3$ | H | H | OCH$_2$O | Q1 |
| 247: | H | H | H | CH$_3$ | H | H | O(CH$_2$)$_2$O | Q1 |
| 248: | H | H | H | CH$_3$ | H | H | O(CH$_2$)$_3$O | Q1 |
| 249: | H | H | H | CH$_3$ | H | H | O(CH$_2$)$_4$O | Q1 |
| 250: | H | H | H | CH$_3$ | H | H | O(CH$_2$)$_5$O | Q1 |
| 251: | H | H | H | CH$_3$ | H | H | O(CH$_2$)$_6$O | Q1 |
| 252: | H | H | H | CH$_3$ | H | H | O(CH$_2$)$_7$O | Q1 |
| 253: | H | H | H | CH$_3$ | H | H | O(CH$_2$)$_8$O | Q1 |
| 254: | H | H | H | CH$_3$ | H | H | O(CH$_2$)$_9$O | Q1 |
| 255: | H | H | H | CH$_3$ | H | H | O(CH$_2$)$_{10}$O | Q1 |
| 256: | H | H | H | CH$_3$ | H | H | O(CH$_2$)$_{11}$O | Q1 |
| 257: | H | H | H | CH$_3$ | H | H | O(CH$_2$)$_{12}$O | Q1 |
| 258: | H | H | H | H | CH$_3$ | H | O | Q8 |
| 259: | H | H | H | H | CH$_3$ | H | OCH$_2$ | Q8 |
| 260: | H | H | H | H | CH$_3$ | H | O(CH$_2$)$_2$ | Q8 |
| 261: | H | H | H | H | CH$_3$ | H | O(CH$_2$)$_3$ | Q8 |
| 262: | H | H | H | H | CH$_3$ | H | O(CH$_2$)$_4$ | Q8 |
| 263: | H | H | H | H | CH$_3$ | H | O(CH$_2$)$_5$ | Q8 |
| 264: | H | H | H | H | CH$_3$ | H | O(CH$_2$)$_6$ | Q8 |
| 265: | H | H | H | H | CH$_3$ | H | O(CH$_2$)$_7$ | Q8 |
| 266: | H | H | H | H | CH$_3$ | H | O(CH$_2$)$_8$ | Q8 |
| 267: | H | H | H | H | CH$_3$ | H | O(CH$_2$)$_9$ | Q8 |
| 268: | H | H | H | H | CH$_3$ | H | O(CH$_2$)$_{10}$ | Q8 |
| 269: | H | H | H | H | CH$_3$ | H | O(CH$_2$)$_{11}$ | Q8 |
| 270: | H | H | H | H | CH$_3$ | H | O(CH$_2$)$_{12}$ | Q8 |
| 271: | H | H | H | H | CH$_3$ | H | OCH$_2$OCO | Q1 |
| 272: | H | H | H | H | CH$_3$ | H | O(CH$_2$)$_2$OCO | Q1 |
| 273: | H | H | H | H | CH$_3$ | H | O(CH$_2$)$_3$OCO | Q1 |
| 274: | H | H | H | H | CH$_3$ | H | O(CH$_2$)$_4$OCO | Q1 |
| 275: | H | H | H | H | CH$_3$ | H | O(CH$_2$)$_5$OCO | Q1 |
| 276: | H | H | H | H | CH$_3$ | H | O(CH$_2$)$_6$OCO | Q1 |
| 277: | H | H | H | H | CH$_3$ | H | O(CH$_2$)$_7$OCO | Q1 |
| 278: | H | H | H | H | CH$_3$ | H | O(CH$_2$)$_8$OCO | Q1 |
| 279: | H | H | H | H | CH$_3$ | H | O(CH$_2$)$_9$OCO | Q1 |
| 280: | H | H | H | H | CH$_3$ | H | O(CH$_2$)$_{10}$OCO | Q1 |
| 281: | H | H | H | H | CH$_3$ | H | O(CH$_2$)$_{11}$OCO | Q1 |
| 282: | H | H | H | H | CH$_3$ | H | O(CH$_2$)$_{12}$OCO | Q1 |
| 283: | H | H | H | H | CH$_3$ | H | OCH$_2$OCO | Q5 |
| 284: | H | H | H | H | CH$_3$ | H | O(CH$_2$)$_2$OCO | Q5 |
| 285: | H | H | H | H | CH$_3$ | H | O(CH$_2$)$_3$OCO | Q5 |
| 286: | H | H | H | H | CH$_3$ | H | O(CH$_2$)$_4$OCO | Q5 |
| 287: | H | H | H | H | CH$_3$ | H | O(CH$_2$)$_5$OCO | Q5 |
| 288: | H | H | H | H | CH$_3$ | H | O(CH$_2$)$_6$OCO | Q5 |
| 289: | H | H | H | H | CH$_3$ | H | O(CH$_2$)$_7$OCO | Q5 |
| 290: | H | H | H | H | CH$_3$ | H | O(CH$_2$)$_8$OCO | Q5 |
| 291: | H | H | H | H | CH$_3$ | H | O(CH$_2$)$_9$OCO | Q5 |
| 292: | H | H | H | H | CH$_3$ | H | O(CH$_2$)$_{10}$OCO | Q5 |
| 293: | H | H | H | H | CH$_3$ | H | O(CH$_2$)$_{11}$OCO | Q5 |
| 294: | H | H | H | H | CH$_3$ | H | O(CH$_2$)$_{12}$OCO | Q5 |
| 295: | H | H | H | H | CH$_3$ | H | OCH$_2$O | Q1 |
| 296: | H | H | H | H | CH$_3$ | H | O(CH$_2$)$_2$O | Q1 |
| 297: | H | H | H | H | CH$_3$ | H | O(CH$_2$)$_3$O | Q1 |
| 298: | H | H | H | H | CH$_3$ | H | O(CH$_2$)$_4$O | Q1 |
| 299: | H | H | H | H | CH$_3$ | H | O(CH$_2$)$_5$O | Q1 |
| 300: | H | H | H | H | CH$_3$ | H | O(CH$_2$)$_6$O | Q1 |
| 301: | H | H | H | H | CH$_3$ | H | O(CH$_2$)$_7$O | Q1 |
| 302: | H | H | H | H | CH$_3$ | H | O(CH$_2$)$_8$O | Q1 |
| 303: | H | H | H | H | CH$_3$ | H | O(CH$_2$)$_9$O | Q1 |
| 304: | H | H | H | H | CH$_3$ | H | O(CH$_2$)$_{10}$O | Q1 |
| 305: | H | H | H | H | CH$_3$ | H | O(CH$_2$)$_{11}$O | Q1 |
| 306: | H | H | H | H | CH$_3$ | H | O(CH$_2$)$_{12}$O | Q1 |
| 307: | H | CH$_3$ | H | CH$_3$ | H | H | O | Q8 |
| 308: | H | CH$_3$ | H | CH$_3$ | H | H | OCH$_2$ | Q8 |

-continued

| DLC: | A¹ | A² | Y | Z¹ | Z² | Z³ | L | Q |
|---|---|---|---|---|---|---|---|---|
| 309: | H | CH$_3$ | H | CH$_3$ | H | H | O(CH$_2$)$_2$ | Q8 |
| 310: | H | CH$_3$ | H | CH$_3$ | H | H | O(CH$_2$)$_3$ | Q8 |
| 311: | H | CH$_3$ | H | CH$_3$ | H | H | O(CH$_2$)$_4$ | Q8 |
| 312: | H | CH$_3$ | H | CH$_3$ | H | H | O(CH$_2$)$_5$ | Q8 |
| 313: | H | CH$_3$ | H | CH$_3$ | H | H | O(CH$_2$)$_6$ | Q8 |
| 314: | H | CH$_3$ | H | CH$_3$ | H | H | O(CH$_2$)$_7$ | Q8 |
| 315: | H | CH$_3$ | H | CH$_3$ | H | H | O(CH$_2$)$_8$ | Q8 |
| 316: | H | CH$_3$ | H | CH$_3$ | H | H | O(CH$_2$)$_9$ | Q8 |
| 317: | H | CH$_3$ | H | CH$_3$ | H | H | O(CH$_2$)$_{10}$ | Q8 |
| 318: | H | CH$_3$ | H | CH$_3$ | H | H | O(CH$_2$)$_{11}$ | Q8 |
| 319: | H | CH$_3$ | H | CH$_3$ | H | H | O(CH$_2$)$_{12}$ | Q8 |
| 320: | H | CH$_3$ | H | CH$_3$ | H | H | OCH$_2$OCO | Q1 |
| 321: | H | CH$_3$ | H | CH$_3$ | H | H | O(CH$_2$)$_2$OCO | Q1 |
| 322: | H | CH$_3$ | H | CH$_3$ | H | H | O(CH$_2$)$_3$OCO | Q1 |
| 323: | H | CH$_3$ | H | CH$_3$ | H | H | O(CH$_2$)$_4$OCO | Q1 |
| 324: | H | CH$_3$ | H | CH$_3$ | H | H | O(CH$_2$)$_5$OCO | Q1 |
| 325: | H | CH$_3$ | H | CH$_3$ | H | H | O(CH$_2$)$_6$OCO | Q1 |
| 326: | H | CH$_3$ | H | CH$_3$ | H | H | O(CH$_2$)$_7$OCO | Q1 |
| 327: | H | CH$_3$ | H | CH$_3$ | H | H | O(CH$_2$)$_8$OCO | Q1 |
| 328: | H | CH$_3$ | H | CH$_3$ | H | H | O(CH$_2$)$_9$OCO | Q1 |
| 329: | H | CH$_3$ | H | CH$_3$ | H | H | O(CH$_2$)$_{10}$OCO | Q1 |
| 330: | H | CH$_3$ | H | CH$_3$ | H | H | O(CH$_2$)$_{11}$OCO | Q1 |
| 331: | H | CH$_3$ | H | CH$_3$ | H | H | O(CH$_2$)$_{12}$OCO | Q1 |
| 332: | H | CH$_3$ | H | CH$_3$ | H | H | OCH$_2$OCO | Q5 |
| 333: | H | CH$_3$ | H | CH$_3$ | H | H | O(CH$_2$)$_2$OCO | Q5 |
| 334: | H | CH$_3$ | H | CH$_3$ | H | H | O(CH$_2$)$_3$OCO | Q5 |
| 335: | H | CH$_3$ | H | CH$_3$ | H | H | O(CH$_2$)$_4$OCO | Q5 |
| 336: | H | CH$_3$ | H | CH$_3$ | H | H | O(CH$_2$)$_5$OCO | Q5 |
| 337: | H | CH$_3$ | H | CH$_3$ | H | H | O(CH$_2$)$_6$OCO | Q5 |
| 338: | H | CH$_3$ | H | CH$_3$ | H | H | O(CH$_2$)$_7$OCO | Q5 |
| 339: | H | CH$_3$ | H | CH$_3$ | H | H | O(CH$_2$)$_8$OCO | Q5 |
| 340: | H | CH$_3$ | H | CH$_3$ | H | H | O(CH$_2$)$_9$OCO | Q5 |
| 341: | H | CH$_3$ | H | CH$_3$ | H | H | O(CH$_2$)$_{10}$OCO | Q5 |
| 342: | H | CH$_3$ | H | CH$_3$ | H | H | O(CH$_2$)$_{11}$OCO | Q5 |
| 343: | H | CH$_3$ | H | CH$_3$ | H | H | O(CH$_2$)$_{12}$OCO | Q5 |
| 344: | H | CH$_3$ | H | CH$_3$ | H | H | OCH$_2$O | Q1 |
| 345: | H | CH$_3$ | H | CH$_3$ | H | H | O(CH$_2$)$_2$O | Q1 |
| 346: | H | CH$_3$ | H | CH$_3$ | H | H | O(CH$_2$)$_3$O | Q1 |
| 347: | H | CH$_3$ | H | CH$_3$ | H | H | O(CH$_2$)$_4$O | Q1 |
| 348: | H | CH$_3$ | H | CH$_3$ | H | H | O(CH$_2$)$_5$O | Q1 |
| 349: | H | CH$_3$ | H | CH$_3$ | H | H | O(CH$_2$)$_6$O | Q1 |
| 350: | H | CH$_3$ | H | CH$_3$ | H | H | O(CH$_2$)$_7$O | Q1 |
| 351: | H | CH$_3$ | H | CH$_3$ | H | H | O(CH$_2$)$_8$O | Q1 |
| 352: | H | CH$_3$ | H | CH$_3$ | H | H | O(CH$_2$)$_9$O | Q1 |
| 353: | H | CH$_3$ | H | CH$_3$ | H | H | O(CH$_2$)$_{10}$O | Q1 |
| 354: | H | CH$_3$ | H | CH$_3$ | H | H | O(CH$_2$)$_{11}$O | Q1 |
| 355: | H | CH$_3$ | H | CH$_3$ | H | H | O(CH$_2$)$_{12}$O | Q1 |
| 356: | H | H | H | H | H | H | (OCH$_2$CH$_2$)$_2$ | Q8 |
| 357: | H | H | H | H | H | H | (OCH$_2$CH$_2$)$_3$ | Q8 |
| 358: | H | H | H | H | H | H | (OCH$_2$CH$_2$)$_4$ | Q8 |
| 359: | H | H | H | H | H | H | (OCH$_2$CH$_2$)$_2$OCO | Q1 |
| 360: | H | H | H | H | H | H | (OCH$_2$CH$_2$)$_3$OCO | Q1 |
| 361: | H | H | H | H | H | H | (OCH$_2$CH$_2$)$_4$OCO | Q1 |
| 362: | H | H | H | H | H | H | (OCH$_2$CH$_2$)$_2$OCO | Q5 |
| 363: | H | H | H | H | H | H | (OCH$_2$CH$_2$)$_3$OCO | Q5 |
| 364: | H | H | H | H | H | H | (OCH$_2$CH$_2$)$_4$OCO | Q5 |
| 365: | H | H | H | H | H | H | (OCH$_2$CH$_2$)$_2$O | Q1 |
| 366: | H | H | H | H | H | H | (OCH$_2$CH$_2$)$_3$O | Q1 |
| 367: | H | H | H | H | H | H | (OCH$_2$CH$_2$)$_4$O | Q1 |
| 368: | H | H | H | H | H | H | O(CH$_2$)$_2$OCO | Q2 |
| 369: | H | H | H | H | H | H | O(CH$_2$)$_3$OCO | Q2 |
| 370: | H | H | H | H | H | H | O(CH$_2$)$_4$OCO | Q2 |
| 371: | H | H | H | H | H | H | O(CH$_2$)$_5$OCO | Q2 |
| 372: | H | H | H | H | H | H | O(CH$_2$)$_6$OCO | Q2 |
| 373: | H | H | H | H | H | H | O(CH$_2$)$_7$OCO | Q2 |
| 374: | H | H | H | H | H | H | O(CH$_2$)$_8$OCO | Q2 |
| 375: | H | H | H | H | H | H | O(CH$_2$)$_9$OCO | Q2 |
| 376: | H | H | H | H | H | H | O(CH$_2$)$_{10}$OCO | Q2 |
| 377: | H | H | H | H | H | H | O(CH$_2$)$_{11}$OCO | Q2 |
| 378: | H | H | H | H | H | H | O(CH$_2$)$_{12}$OCO | Q2 |
| 379: | H | H | H | H | H | H | O(CH$_2$)$_2$C*HCH$_3$(CH$_2$)$_3$ | Q8 |
| 380: | H | H | H | H | H | H | O(CH$_2$)$_2$C*HCH$_3$(CH$_2$)$_3$OCO | Q1 |
| 381: | H | H | H | H | H | H | O(CH$_2$)$_2$C*HCH$_3$(CH$_2$)$_3$OCO | Q5 |
| 382: | H | H | H | H | H | H | O(CH$_2$)$_2$C*HCH$_3$(CH$_2$)$_3$O | Q1 |
| 383: | H | H | H | H | H | H | O(CH$_2$)$_2$C*HCH$_3$(CH$_2$)$_3$ | Q8 |
| 384: | H | H | H | H | H | H | O(CH$_2$)$_2$C*HCH$_3$(CH$_2$)$_3$OCO | Q1 |
| 385: | H | H | H | H | H | H | O(CH$_2$)$_2$C*HCH$_3$(CH$_2$)$_3$OCO | Q5 |

-continued

| DLC: | A¹ | A² | Y | Z¹ | Z² | Z³ | L | Q |
|---|---|---|---|---|---|---|---|---|
| 386: | H | H | H | H | H | H | O(CH$_2$)$_2$C*HCH$_3$(CH$_2$)$_3$O | Q1 |
| 387: | H | H | H | H | H | H | O(CH$_2$)$_2$C*HCH$_3$(CH$_2$)$_3$ | Q8 |
| 388: | H | H | H | H | H | H | O(CH$_2$)$_2$C*HCH$_3$(CH$_2$)$_3$OCO | Q1 |
| 389: | H | H | H | H | H | H | O(CH$_2$)$_2$C*HCH$_3$(CH$_2$)$_3$OCO | Q5 |
| 390: | H | H | H | H | H | H | O(CH$_2$)$_2$C*HCH$_3$(CH$_2$)$_3$O | Q1 |
| 391: | H | H | H | H | H | H | (CH$_2$)$_4$ | Q8 |
| 392: | H | H | H | H | H | H | (CH$_2$)$_5$ | Q8 |
| 393: | H | H | H | H | H | H | (CH$_2$)$_6$ | Q8 |
| 394: | H | H | H | H | H | H | (CH$_2$)$_7$ | Q8 |
| 395: | H | H | H | H | H | H | (CH$_2$)$_8$ | Q8 |
| 396: | H | H | H | H | H | H | (CH$_2$)$_4$OCO | Q1 |
| 397: | H | H | H | H | H | H | (CH$_2$)$_5$OCO | Q1 |
| 398: | H | H | H | H | H | H | (CH$_2$)$_6$OCO | Q1 |
| 399: | H | H | H | H | H | H | (CH$_2$)$_7$OCO | Q1 |
| 400: | H | H | H | H | H | H | (CH$_2$)$_8$OCO | Q1 |
| 401: | H | H | H | H | H | H | (CH$_2$)$_4$OCO | Q5 |
| 402: | H | H | H | H | H | H | (CH$_2$)$_5$OCO | Q5 |
| 403: | H | H | H | H | H | H | (CH$_2$)$_6$OCO | Q5 |
| 404: | H | H | H | H | H | H | (CH$_2$)$_7$OCO | Q5 |
| 405: | H | H | H | H | H | H | (CH$_2$)$_8$OCO | Q5 |
| 406: | H | H | H | H | H | H | (CH$_2$)$_4$O | Q1 |
| 407: | H | H | H | H | H | H | (CH$_2$)$_5$O | Q1 |
| 408: | H | H | H | H | H | H | (CH$_2$)$_6$O | Q1 |
| 409: | H | H | H | H | H | H | (CH$_2$)$_7$O | Q1 |
| 410: | H | H | H | H | H | H | (CH$_2$)$_8$O | Q1 |
| 411: | H | H | H | H | H | H | O(CH$_2$)$_2$COO(CH$_2$)$_2$ | Q8 |
| 412: | H | H | H | H | H | H | O(CH$_2$)$_2$COO(CH$_2$)$_2$OCO | Q1 |
| 413: | H | H | H | H | H | H | O(CH$_2$)$_2$COO(CH$_2$)$_2$OCO | Q5 |
| 414: | H | H | H | H | H | H | O(CH$_2$)$_2$COO(CH$_2$)$_2$O | Q1 |
| 415: | H | H | H | H | H | H | O(CH$_2$)$_2$CO(CH$_2$)$_3$ | Q8 |
| 416: | H | H | H | H | H | H | O(CH$_2$)$_2$CO(CH$_2$)$_3$OCO | Q1 |
| 417: | H | H | H | H | H | H | O(CH$_2$)$_2$CO(CH$_2$)$_3$OCO | Q5 |
| 418: | H | H | H | H | H | H | O(CH$_2$)$_2$CO(CH$_2$)$_3$O | Q1 |
| 419: | H | H | H | H | H | H | O(CH$_2$)$_2$CH=CH(CH$_2$)$_2$ | Q8 |
| 420: | H | H | H | H | H | H | O(CH$_2$)$_2$CH=CH(CH$_2$)$_2$OCO | Q1 |
| 421: | H | H | H | H | H | H | O(CH$_2$)$_2$CH=CH(CH$_2$)$_2$OCO | Q5 |
| 422: | H | H | H | H | H | H | O(CH$_2$)$_2$CH=CH(CH$_2$)$_2$O | Q1 |
| 423: | H | H | H | H | H | H | OCH$_2$C≡C(CH$_2$)$_3$ | Q8 |
| 424: | H | H | H | H | H | H | OCH$_2$C≡C(CH$_2$)$_3$OCO | Q1 |
| 425: | H | H | H | H | H | H | OCH$_2$C≡C(CH$_2$)$_3$OCO | Q5 |
| 426: | H | H | H | H | H | H | OCH$_2$C≡C(CH$_2$)$_3$O | Q1 |

(427)–(470)

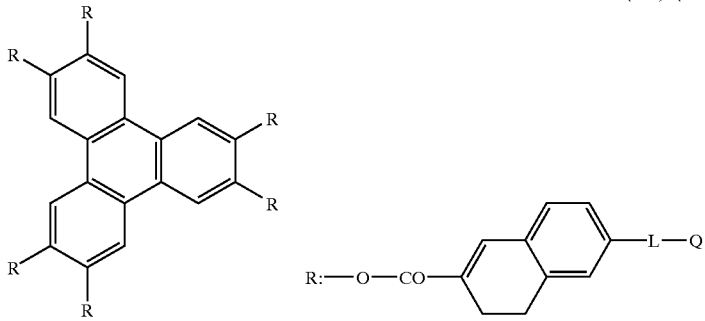

| DLC | (427: | (428: | (429) | (430) | (431) |
|---|---|---|---|---|---|
| L | O(CH$_2$)$_2$ | O(CH$_2$)$_3$ | O(CH$_2$)$_4$ | O(CH$_2$)$_5$ | O(CH$_2$)$_6$ |
| Q | Q8 | Q8 | Q8 | Q8 | Q8 |
| DLC | (432) | (433) | (434) | (435) | (436) |
| L | O(CH$_2$)$_7$ | O(CH$_2$)$_8$ | O(CH$_2$)$_9$ | O(CH$_2$)$_{10}$ | O(CH$_2$)$_{11}$ |
| Q | Q8 | Q8 | Q8 | Q8 | Q8 |
| DLC | (437) | (438) | (439) | (440) | (441) |
| L | O(CH$_2$)$_{12}$ | O(CH$_2$)$_2$OCO | O(CH$_2$)$_3$OCO | O(CH$_2$)$_4$OCO | O(CH$_2$)$_5$OCO |
| Q | Q8 | Q1 | Q1 | Q1 | Q1 |
| DLC | (442) | (443) | (444) | (445) | (446) |
| L | O(CH$_2$)$_6$OCO | O(CH$_2$)$_7$OCO | O(CH$_2$)$_8$OCO | O(CH$_2$)$_9$OCO | Q(CH$_2$)$_{10}$OCO |
| Q | Q1 | Q1 | Q1 | Q1 | Q1 |

-continued (427)–(470)

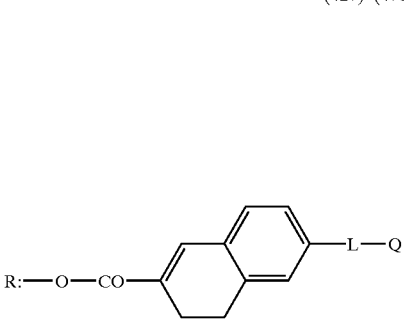

| DLC | (447) | (448) | (449) | (450) | (451) |
|---|---|---|---|---|---|
| L | O(CH$_2$)$_{11}$OCO | O(CH$_2$)$_{12}$OCO | O(CH$_2$)$_2$OCO | O(CH$_2$)$_3$OCO | O(CH$_2$)$_4$OCO |
| Q | Q1 | Q1 | Q5 | Q5 | Q5 |
| DLC | (452) | (453) | (454) | (455) | (456) |
| L | O(CH$_2$)$_5$OCO | O(CH$_2$)$_6$OCO | O(CH$_2$)$_7$OCO | O(CH$_2$)$_8$OCO | O(CH$_2$)$_9$OCO |
| Q | Q5 | Q5 | Q5 | Q5 | Q5 |
| DLC | (457) | (458) | (459) | (460) | (461) |
| L | O(CH$_2$)$_{10}$OCO | O(CH$_2$)$_{11}$OCO | O(CH$_2$)$_{12}$OCO | O(CH$_2$)$_2$O | O(CH$_2$)$_3$O |
| Q | Q5 | Q5 | Q5 | Q1 | Q1 |
| DLC | (462) | (463) | (464) | (465) | (466) |
| L | O(CH$_2$)$_4$O | O(CH$_2$)$_5$O | O(CH$_2$)$_6$O | O(CH$_2$)$_7$O | O(CH$_2$)$_8$O |
| Q | Q1 | Q1 | Q1 | Q1 | Q1 |
| DLC | (467) | (468) | (469) | (470) | |
| L | O(CH$_2$)$_9$O | O(CH$_2$)$_{10}$O | O(CH$_2$)$_{11}$O | O(CH$_2$)$_{12}$O | |
| Q | Q1 | Q1 | Q1 | Q1 | |

(471)–(514)

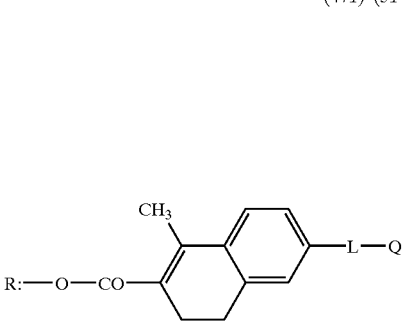

| DLC | (471) | (472) | (473) | (474) | (475) |
|---|---|---|---|---|---|
| L | O(CH$_2$)$_2$ | O(CH$_2$)$_3$ | O(CH$_2$)$_4$ | O(CH$_2$)$_5$ | O(CH$_2$)$_6$ |
| Q | Q8 | Q8 | Q8 | Q8 | Q8 |
| DLC | (476) | (477) | (478) | (479) | (480) |
| L | O(CH$_2$)$_7$ | O(CH$_2$)$_8$ | O(CH$_2$)$_9$ | O(CH$_2$)$_{10}$ | O(CH$_2$)$_{11}$ |
| Q | Q8 | Q8 | Q8 | Q8 | Q8 |
| DLC | (481) | (482) | (483) | (484) | (485) |
| L | O(CH$_2$)$_{12}$ | O(CH$_2$)$_2$OCO | O(CH$_2$)$_3$OCO | O(CH$_2$)$_4$OCO | O(CH$_2$)$_5$OCO |
| Q | Q8 | Q1 | Q1 | Q1 | Q1 |
| DLC | (486) | (487) | (488) | (489) | (490) |
| L | O(CH$_2$)$_6$OCO | O(CH$_2$)$_7$OCO | O(CH$_2$)$_8$OCO | O(CH$_2$)$_9$OCO | O(CH$_2$)$_{10}$OCO |
| Q | Q1 | Q1 | Q1 | Q1 | Q1 |
| DLC | (491) | (492) | (493) | (494) | (495) |
| L | O(CH$_2$)$_{11}$OCO | O(CH$_2$)$_{12}$OCO | O(CH$_2$)$_2$OCO | O(CH$_2$)$_3$OCO | O(CH$_2$)$_4$OCO |
| Q | Q1 | Q1 | Q5 | Q5 | Q5 |
| DLC | (496) | (497) | (498) | (499) | (500) |
| L | O(CH$_2$)$_5$OCO | O(CH$_2$)$_6$OCO | O(CH$_2$)$_7$OCO | O(CH$_2$)$_8$OCO | O(CH$_2$)$_9$OCO |
| Q | Q5 | Q5 | Q5 | Q5 | Q5 |
| DLC | (501) | (502) | (503) | (504) | (505) |
| L | O(CH$_2$)$_{10}$OCO | O(CH$_2$)$_{11}$OCO | O(CH$_2$)$_{12}$OCO | O(CH$_2$)$_2$O | O(CH$_2$)$_3$O |
| Q | Q5 | Q5 | Q5 | Q1 | Q1 |
| DLC | (506) | (507) | (508) | (509) | (510) |
| L | O(CH$_2$)$_4$O | O(CH$_2$)$_5$O | O(CH$_2$)$_6$O | O(CH$_2$)$_7$O | O(CH$_2$)$_8$O |
| Q | Q1 | Q1 | Q1 | Q1 | Q1 |

-continued

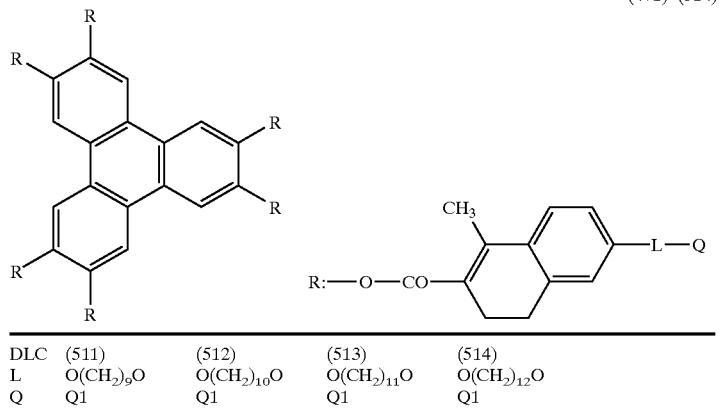

(471)–(514)

| DLC | (511) | (512) | (513) | (514) |
|---|---|---|---|---|
| L | $O(CH_2)_9O$ | $O(CH_2)_{10}O$ | $O(CH_2)_{11}O$ | $O(CH_2)_{12}O$ |
| Q | Q1 | Q1 | Q1 | Q1 |

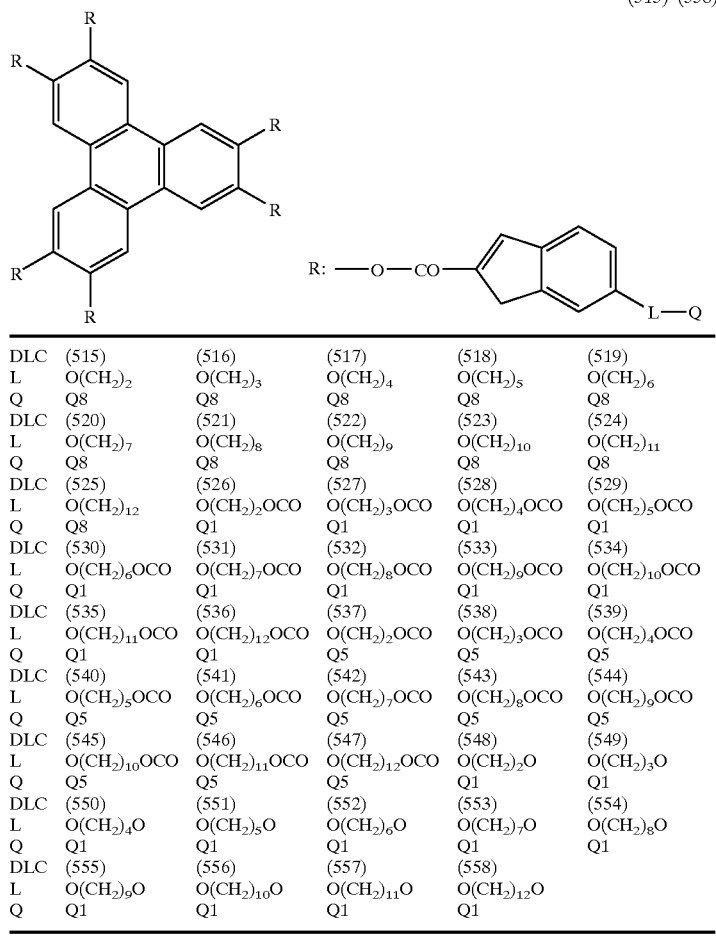

(515)–(558)

| DLC | (515) | (516) | (517) | (518) | (519) |
|---|---|---|---|---|---|
| L | $O(CH_2)_2$ | $O(CH_2)_3$ | $O(CH_2)_4$ | $O(CH_2)_5$ | $O(CH_2)_6$ |
| Q | Q8 | Q8 | Q8 | Q8 | Q8 |
| DLC | (520) | (521) | (522) | (523) | (524) |
| L | $O(CH_2)_7$ | $O(CH_2)_8$ | $O(CH_2)_9$ | $O(CH_2)_{10}$ | $O(CH_2)_{11}$ |
| Q | Q8 | Q8 | Q8 | Q8 | Q8 |
| DLC | (525) | (526) | (527) | (528) | (529) |
| L | $O(CH_2)_{12}$ | $O(CH_2)_2OCO$ | $O(CH_2)_3OCO$ | $O(CH_2)_4OCO$ | $O(CH_2)_5OCO$ |
| Q | Q8 | Q1 | Q1 | Q1 | Q1 |
| DLC | (530) | (531) | (532) | (533) | (534) |
| L | $O(CH_2)_6OCO$ | $O(CH_2)_7OCO$ | $O(CH_2)_8OCO$ | $O(CH_2)_9OCO$ | $O(CH_2)_{10}OCO$ |
| Q | Q1 | Q1 | Q1 | Q1 | Q1 |
| DLC | (535) | (536) | (537) | (538) | (539) |
| L | $O(CH_2)_{11}OCO$ | $O(CH_2)_{12}OCO$ | $O(CH_2)_2OCO$ | $O(CH_2)_3OCO$ | $O(CH_2)_4OCO$ |
| Q | Q1 | Q1 | Q5 | Q5 | Q5 |
| DLC | (540) | (541) | (542) | (543) | (544) |
| L | $O(CH_2)_5OCO$ | $O(CH_2)_6OCO$ | $O(CH_2)_7OCO$ | $O(CH_2)_8OCO$ | $O(CH_2)_9OCO$ |
| Q | Q5 | Q5 | Q5 | Q5 | Q5 |
| DLC | (545) | (546) | (547) | (548) | (549) |
| L | $O(CH_2)_{10}OCO$ | $O(CH_2)_{11}OCO$ | $O(CH_2)_{12}OCO$ | $O(CH_2)_2O$ | $O(CH_2)_3O$ |
| Q | Q5 | Q5 | Q5 | Q1 | Q1 |
| DLC | (550) | (551) | (552) | (553) | (554) |
| L | $O(CH_2)_4O$ | $O(CH_2)_5O$ | $O(CH_2)_6O$ | $O(CH_2)_7O$ | $O(CH_2)_8O$ |
| Q | Q1 | Q1 | Q1 | Q1 | Q1 |
| DLC | (555) | (556) | (557) | (558) | |
| L | $O(CH_2)_9O$ | $O(CH_2)_{10}O$ | $O(CH_2)_{11}O$ | $O(CH_2)_{12}O$ | |
| Q | Q1 | Q1 | Q1 | Q1 | |

In place of introducing an asymmetric carbon atom into the divalent linking group of the discotic liquid crystal molecule, the molecules can also be spirally twisted by adding an optical active compound containing an asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously)

aligned. At the same time, the chiral agent having a polymerizable group can also be fixed by the same or a similar polymerization reaction.

The optically anisotropic layer can further contain a fluorine-containing surface active agent or a cellulose ester, which has a function of uniformly (homogeneously) aligning the discotic liquid crystal molecules placed near the interface between the layer and air.

The fluorine-containing surface active agent comprises a hydrophobic group having a fluorine atom, a nonionic, anionic, cationic or amphoteric hydrophilic group and an optional connecting group.

The fluorine-containing surface active agent comprising one hydrophobic group and one hydrophilic group is represented by the following formula:

Rf—L5—Hy

In the formula, Rf is a monovalent hydrocarbon group substituted with a fluorine atom, L5 is a single bond or a divalent linking group, and Hy is a hydrophilic group.

The group Rf functions as a hydrophobic group. The hydrocarbon group is preferably an alkyl group or an aryl group. The alkyl group preferably has 3 to 30 carbon atoms, and the aryl group preferably has 6 to 30 carbon atoms.

Hydrogen atoms of the hydrocarbon group are partly or fully substituted with fluorine atoms. Preferably not less than 50%, more preferably not less than 60%, further preferably 70% and most preferably not less than 80% of the hydrogen atoms are substituted with fluorine atoms.

The hydrogen atoms not substituted with fluorine atoms may be further substituted with other halogen atoms (e.g., chlorine, bromine).

Examples of Rf are shown below.

Rf1: n—$C_8F_{17}$—
Rf2: n—$C_6F_{13}$—
Rf3: Cl—$(CF_2—CFCl)_3$—$CF_2$—
Rf4: H—$(CF_2)_8$—
Rf5: H—$(CF_2)_{10}$—
Rf6: H—$C_9F_{19}$—
Rf7: pentafluorophenyl
Rf8: H—$C_7F_{15}$—
Rf9: Cl—$(CF_2—CFCl)_2$—$CF_2$—
Rf10: H—$(CF_2)_4$—
Rf11: H—$(CF_2)_6$—
Rf12: Cl—$(CF_2)_6$—
Rf13: $C_3F_7$—

In the formula, the divalent linking group is preferably selected from the group consisting of an alkylene group, an arylene group, a divalent heterocyclic residue, —CO—, —NR— (here R is a hydrogen or an alkyl group having 1 to 5 carbon atoms), —O—, —$SO_2$— and the combination thereof.

Examples of L5 are shown below. In each of the examples, the left side is attached to the hydrophobic group (Rf), and the right side is attached to the hydrophilic group (Hy). The AL means an alkylene group, the AR means an arylene group, and the Hc means a divalent heterocyclic residue. The alkylene group, the arylene group and the divalent heterocyclic residue may have substituent groups (e.g., alkyl groups).

L0: single bond
L51: —$SO_2$—NR—
L52: —AL—O—
L53: —CO—NR—
L54: —AR—O—
L55: —$SO_2$—NR—AL—CO—O—
L56: —CO—O—
L57: —$SO_2$—NR—AL—O—
L58: —$SO_2$—NR—AL—
L59: —CO—NR—AL—
L60: —AL—O—AL—
L61: —Hc—AL—
L62: —$SO_2$—NR—AL—O—AL—
L63: —AR—
L64: —O—AR—$SO_2$—NR—AL—
L65: —O—AR—$SO_2$—NR—
L66: —O—AR—O—

The Hy in the formula is a nonionic, anionic, cationic or amphoteric hydrophilic group. A nonionic hydrophilic group is particularly preferred.

Examples of Hy are shown below.

Hy1: —$(CH_2CH_2O)_n$—H (n is an integer of 5 to 30)
Hy2: —$(CH_2CH_2O)_n$—R1 (n is an integer of 5 to 30, R1 is an alkyl group having 1 to 6 carbon atoms)
Hy3: —$(CH_2CHOHCH_2)_n$—H (n is an integer of 5 to 30)
Hy4: —COOM (M represents hydrogen, an alkali metal atom or dissociated form)
Hy5: —$SO_3M$ (M represents hydrogen, an alkali metal atom or dissociated form)
Hy6: —$(CH_2CH_2O)_n$—$CH_2CH_2CH_2$—$SO_3M$ (n is an integer of 5 to 30, M is hydrogen or an alkali metal atom)
Hy7: —$OPO(OH)_3$
Hy8: —$N^+(CH3)3·X^-$ (X is a halogen atom)
Hy9: —$COONH_4$ Nonionic hydrophilic groups (Hy1, Hy2, Hy3) are preferred, and a group comprising polyethylene oxide (Hy1) is most preferred.

A fluorine-containing surface active agent having a fluorine-containing hydrophobic group or having two or more hydrophilic groups can be used. Two or more fluorine-containing surface active agents can be used in combination.

The fluorine-containing surface active agent is described in various publications [e.g., H. Horiguchi, "New surface active agents (Japanese)" Sankyo-Shuppan (1975); M. J. Schick, "Nonionic Surfactant" Marcell Dekker Inc., New York (1967); Japanese Patent Provisional Publication No. 7(1995)-13293].

The amount of the fluorine-containing surface active agent is in the range of preferably 0.01 to 30 wt. %, more preferably 0.05 to 10 wt. %, further preferably 0.1 to 5 wt. % based on the amount of discotic liquid crystal molecules.

The cellulose ester preferably is a cellulose ester of a lower fatty acid.

The term "lower fatty acid" of the cellulose ester means a fatty acid having 1 to 6 carbon atoms. The lower fatty acid preferably has 2 to 5 carbon atoms, and more preferably has 2 to 4 carbon atoms. The fatty acid may have a substituent group (e.g., hydroxyl). Two or more fatty acids may form an ester with cellulose acetate. Examples of the cellulose esters of the lower fatty acids include cellulose acetate, cellulose propionate, cellulose butyrate, cellulose hydroxypropionate, cellulose acetate propionate and cellulose acetate butyrate. Cellulose acetate butyrate is particularly preferred. Butyric acid content of the cellulose acetate butyrate is preferably not less than 30%, more preferably in the range of 30 to 80%. Acetic acid content of the cellulose acetate butyrate is preferably less than 30%, and more preferably in the range of 1 to 30%.

The coating amount of the cellulose ester is preferably in the range of 0.005 to 0.5 g/m², more preferably in the range of 0.01 to 0.45 g/m², further preferably in the range of 0.02 to 0.4 g/m², and most preferably in the range of 0.03 to 0.35 g/m². The amount of the cellulose ester is also preferably in the range of 0.1 to 5 wt. % based on the amount of the discotic liquid crystal molecules.

An optically anisotropic layer can be formed by coating an orientation layer with a solution containing discotic liquid crystal molecules and optional components such as a compound having an asymmetric carbon atom (a compound having optical rotatory power), a fluorine-containing surface active agent, a polymerization initiator (described below) and other additives.

A solvent for the preparation of the solution preferably is an organic solvent. Examples of the organic solvents include amides (e.g., dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The solution can be coated according to a conventional coating method such as an extrusion coating method, a direct gravure coating method, a reverse gravure coating method, a die coating method or a bar coating method.

The aligned discotic liquid crystal molecules are fixed with the alignment maintained. The discotic liquid crystal molecules are fixed preferably by a polymerization reaction of the polymerizable groups (Q) in the molecules. The polymerization reaction can be classified into a thermal reaction using a thermal polymerization initiator and a photo reaction using a photo polymerization initiator. A photo polymerization reaction is preferred.

Examples of the photo polymerization initiators include (carbonyl compounds (described in U.S. Pat. Nos. 2,367, 661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution.

The light irradiation for the photo polymerization is preferably conducted with an ultraviolet ray.

The exposure energy is preferably in the range of 20 to 50,000 mJ/cm², and more preferably in the range of 100 to 800 mJ/cm². The light irradiation can be conducted with the layer heated to accelerate the photo polymerization reaction.

The optically anisotropic layer has a thickness preferably in the range of 0.1 to 50 μm, more preferably 1 to 30 μm, and most preferably in the range of 5 to 20 μm. In the case that two optical compensatory sheets are used in a liquid crystal display, the preferred thickness of the layer is half of the preferred thickness in the case that one optical compensatory sheet is used.

The discotic liquid crystal molecules in the optically anisotropic layer are aligned at an average inclined angle of 50° to 90°. The inclined angle is preferably uniform. However, the inclined angle can be continuously changed along the thickness of the optical anisotropic layer.

The twist angle of the discotic liquid crystal molecules is preferably similar to a twist angle of a liquid crystal cell of an STN mode, which is usually in the range of 180° to 360°, and preferably in the range of 180° to 270°. The difference between the twist angles is preferably not larger than 100. In the case that one optical compensatory sheet is used in a liquid crystal display, the twist angle of the discotic liquid crystal molecules is preferably in the range of 180° to 360°. In the case that two optical compensatory sheets are used in a liquid crystal display, the twist angle of the discotic liquid crystal molecules is preferably in the range of 90° to 180°.

In a liquid crystal display of an STN mode, a wavelength dependency of the birefringence ($\Delta n(\lambda)$) of an optically anisotropic layer is preferably similar to a wavelength dependency of the birefringence of a liquid crystal cell of an STN mode.

[Liquid Crystal Display]

The optical compensatory sheet of the invention can be used in liquid crystal displays of various modes. Examples of the display modes include TN (twisted nematic) mode, IPS (inplane switching) mode, FLC (ferroelectric liquid crystal) mode, OCB (optically compensatory bend) mode, STN (super twisted nematic) mode, VA (vertically aligned) mode, GH (guest-host) mode and HAN (hybrid aligned nematic) mode. The optical compensatory sheet of the invention is effectively used for a liquid crystal display of a TN or STN mode, and particularly effective for an STN mode.

The liquid crystal display of an STN mode comprises a liquid crystal cell of an STN mode, a pair of optical compensatory sheets arranged on both sides of the cell or one optical compensatory sheet arranged on one side of the cell, and a pair of polarizing elements arranged on both sides.

The alignment of rod-like liquid crystal molecules in the liquid crystal cell and that of the discotic liquid crystal molecules in the optical compensatory sheet is preferably so adjusted that a director of rod-like liquid crystal molecules adjacent to the optical compensatory sheet may be the essentially same direction of a director of the discotic liquid crystal molecules adjacent to the liquid crystal cell. The director of the rod-like liquid crystal molecules means the direction of the long axis of the rod-like molecules. The director of the discotic liquid crystal molecules means the direction of a normal line of the discotic core plane. The essentially same direction means that the angle between the directors viewed along a normal line of the liquid crystal cell is less than ±10°.

The transparent support of the optical compensatory sheet can be used as a protective film of a polarizing plate (on the side facing the liquid crystal cell). In this case, a slow axis (direction showing the maximum refractive index) of the transparent substrate is preferably so arranged that the'slow axis may be essentially perpendicular or parallel to the transmission axis (direction showing the maximum transmittance) of the polarizing plate. The term "essentially perpendicular or parallel" means that a margin for error based on the exact angle is in the range of ±10°.

SYNTHESIS EXAMPLE 1

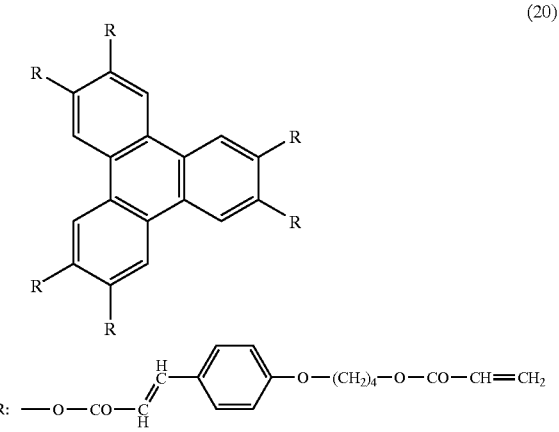

(1a) Synthesis of 4-(4-Hydroxybutyloxy)cinnamic Acid

In a 1 L three neck distillation flask, p-hydroxybenzaldehyde (40.0 g, 328 mmol), 4-chlorobutylacetate (54.3 g, 360 mmol), potassium carbonate (45.3 g, 32.8 mmol) and dimethylformamido (150 ml) were placed and stirred for 3 hours at 120° C. After the reaction mixture was cooled, water was added and the resulting mixture was extracted with ethyl acetate. The solvent was removed to obtain an oily product. To the product, malonic acid (40.8 g, 392 mmol), pyrrolidine (10 ml) and pyridine (200 ml) were added and stirred for 2 hours at 120° C. The mixture was cooled to 60° C., and methanol (200 ml) and 40 wt. % potassium hydroxide aqueous solution (200 ml) were added and stirred for 2 hours at 60° C. The mixture was cooled, and then poured into a dilute hydrochloric acid (prepared by diluting 330 ml of concentrated hydrochloric acid with 4 L water) The deposited crystalline product was collected by filtration, and recrystallized from acetonitrile to obtain the titled compounds (65.6 g, yield: 85%).

(1b) Synthesis of 4-(4-Acryloyloxybutyloxy) cinnamic Acid

In a 500 ml three neck distillation flask, the compound (20.0 g, 84.6 mmol) obtained above in (1a), N,N-dimethylaniline (14.3 g, 118 mmol), acrylic chloride (9.6 ml, 118 mmol), nitrobenzene (0.1 g) and tetrahydrofuran (140 ml) were placed and stirred for 3 hours at 60° C. The mixture was cooled, and then poured into a dilute hydrochloric acid. The deposited crystalline precipitate was collected by filtration. To the obtained crude product, dimethylformamido (30 ml), triethylamine (12 ml) and nitrobenzene (0.1 g) were added. After stirred for 30 minutes at 60° C., the mixture was cooled and then poured into a dilute hydrochloric acid. The deposited crystalline product was collected by filtration, and recrystallized from a mixed solvent of water and acetonitrile to obtain the titled compounds (20.0 g, yield: 81%).

(1c) Synthesis of 2,3,6,7,10,11-Hexakis[4-(4-acryloyloxybutyloxy)cinnamoyl]triphenylene (20)

In a 500 ml three neck distillation flask, methanesulfoyl-chloride (31.6 g, 276 mmol), nitrobenzene (0.24 g) and tetrahydrofuran (180 ml) were placed and cooled to 0° C. To the mixture, a solution dissolving the compound prepared above in (1b) (80.0 g, 276 mmol) and diisopropylamine (39.2 g, 304 mmol) in tetrahydrofuran (180 ml) was dropped. After the mixture was stirred for 1 hour at 0° C., diisopropylethylamine (35.7 g, 276 mmol) and 4-dimethylaminopyridine (3.4 g, 28 mmol) were added and then 2,3,6,7,10,11-hexahydroxytriphenylene (8.1 g, 25 mmol) suspended in tetrahydrofuran (80 ml) was further added. The mixture was stirred for 12 hours at room temperature. Water was added to the mixture, and then the mixture was extracted with ethyl acetate. After the solvent was removed to obtain an oily product, the product was purified through column chromatography to prepare the titled compound (42.4 g, yield: 87%).

| $^1$H-NMR (CDCl$_3$) δ: | |
|---|---|
| 1.85 (24H, brs) | 3.95 (12H, brs) |
| 4.25 (12H, brs) | 5.80 (6H, d) |
| 6.10 (6H, dd) | 6.40 (6H, d) |
| 6.50 (6H, d) | 6.70 (12H, d) |
| 7.30 (12H, d) | 7.85 (6H, d) |
| 8.25 (6H, s) | |

SYNTHESIS EXAMPLE 2

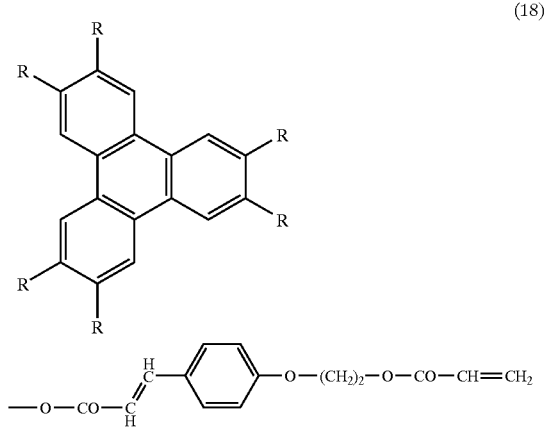

(2a) Synthesis of 4-(2-Hydroxyethyloxy)cinnamic Acid

The procedure of Synthesis Example 1 (1a) was repeated except that 4-chloroethylacetate was used in place of 4-chlorobutylacetate, to prepare the titled compound.

(2b) Synthesis of 4-(2-acryloyloxyethyloxy) cinnamic Acid

The procedure of Synthesis Example 1 (1b) was repeated except that the compound prepared above in (2a) was used, to prepare the titled compound.

(2c) Synthesis of 2,3,6,7,10,11-Hexakis[4-(2-acryloyloxyethyloxy)cinnamoyl]triphenylene (18)

The procedure of Synthesis Example 1 (1c) was repeated except that the compound prepared above in (2b) was used, to prepare the titled compound.

| $^1$H-NMR (CDCl$_3$) δ: | |
|---|---|
| 4.05 (12H, t) | 4.30 (12H, t) |
| 5.80 (6H, d) | 6.10 (6H, dd) |
| 6.40 (6H, d) | 6.50 (6H, d) |
| 6.75 (12H, d) | 7.30 (12H, d) |
| 7.85 (6H, d) | 8.25 (6H, s) |

SYNTHESIS EXAMPLE 3

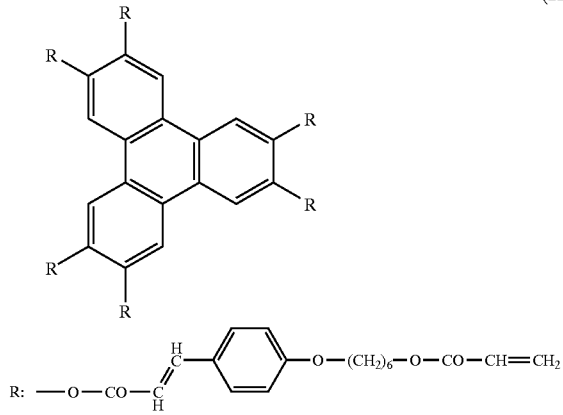

(22)

(3a) Synthesis of 4-(6-Hydroxyhexyloxy)cinnamic Acid

The procedure of Synthesis Example 1 (1a) was repeated except that 4-chlorohexylacetate was used in place of 4-chlorobutylacetate, to prepare the titled compound.

(3b) Synthesis of 4-(6-Acryloyloxyhexyloxy) cinnamic Acid

The procedure of Synthesis Example 1 (1b) was repeated except that the compound prepared above in (3a) was used, to prepare the titled compound.

(3c) Synthesis of 2,3,6,7,10,11-Hexakis[4-(6-acryloyloxyhexyloxy)cinnamoyl]triphenylene (22)

The procedure of Synthesis Example 1 (1c) was repeated except that the compound prepared above in (3b) was used, to prepare the titled compound.

| $^1$H-NMR (CDCl$_3$) δ: | |
|---|---|
| 1.40–1.60 (24H, m) | 1.60–1.90 (24H, m) |
| 3.95 (12H, t) | 4.20 (12H, t) |
| 5.80 (6H, d) | 6.10 (6H, dd) |
| 6.40 (6H, d) | 6.75 (12H, d) |
| 7.30 (12H, d) | 7.85 (6H, d) |
| 8.25 (6H, s) | |

SYNTHESIS EXAMPLE 4

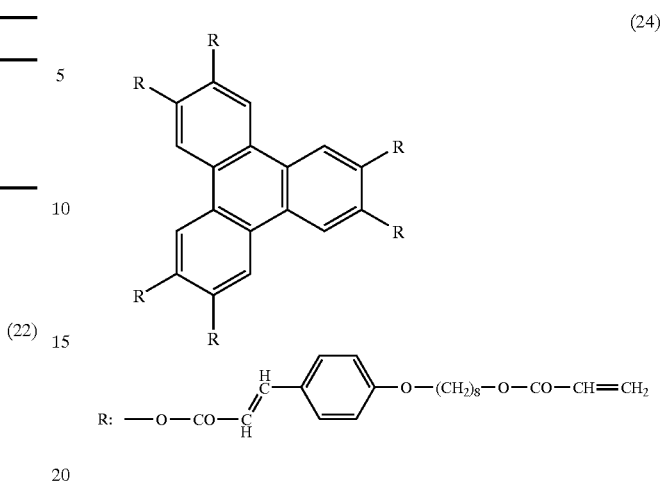

(24)

(4a) Synthesis of 4-(8-Hydroxyoctyloxy)cinnamic Acid

The procedure of Synthesis Example 1 (1a) was repeated except that 4-chlorooctylacetate was used in place of 4-chlorobutylacetate, to prepare the titled compound.

(4b) Synthesis of 4-(8-Acryloyloxyoctyloxy) cinnamic Acid

The procedure of Synthesis Example 1 (1b) was repeated except that the compound prepared above in (4a) was used, to prepare the titled compound.

(4c) Synthesis of 2,3,6,7,10,11-Hexakis[4-(8-acryloyloxyoctyloxy)cinnamoyl]triphenylene (24)

The procedure of Synthesis Example 1 (1c) was repeated except that the compound prepared above in (4b) was used, to prepare the titled compound.

| $^1$H-NMR (CDCl$_3$) δ: | |
|---|---|
| 1.40–1.60 (48H, m) | 1.60–1.90 (24H, m) |
| 3.95 (12H, t) | 4.20 (12H, t) |
| 5.80 (6H, d) | 6.10 (6H, dd) |
| 6.40 (6H, d) | 6.50 (6H, d) |
| 6.75 (12H, d) | 7.30 (12H, d) |
| 7.85 (6H, d) | 8.25 (6H, s) |

SYNTHESIS EXAMPLE 5

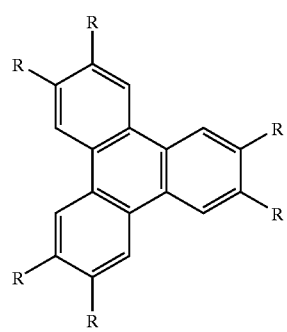

(28)

-continued

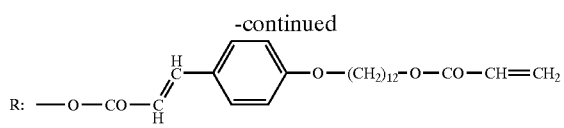

(5a) Synthesis of 4-(10-Hydroxydodecyloxy) cinnamic Acid

The procedure of Synthesis Example 1 (1a) was repeated except that 4-chlorododecylacetate was used in place of 4-chlorobutylacetate, to prepare the titled compound.

(5b) Synthesis of 4-(10-acryloyloxydodecyloxy) cinnamic Acid

The procedure of Synthesis Example 1 (1b) was repeated except that the compound prepared above in (5a) was used, to prepare the titled compound.

(5c) Synthesis of 2,3,6,7,10,11-Hexakis[4-(10-acryloyloxydodecyloxy)cinnamoyl]triphenylene (28)

The procedure of Synthesis Example 1 (1c) was repeated except that the compound prepared above in (5b) was used, to prepare the titled compound.

| $^1$H-NMR (CDCl$_3$) δ: | |
|---|---|
| 1.40–1.60 (96H, m) | 1.60–1.90 (24H, m) |
| 3.95 (12H, t) | 4.20 (12H, t) |
| 5.80 (6H, d) | 6.10 (6H, dd) |
| 6.40 (6H, d) | 6.50 (6H, d) |
| 6.75 (12H, d) | 7.30 (12H, d) |
| 7.85 (6H, d) | 8.25 (6H, s) |

SYNTHESIS EXAMPLE 6

(78)

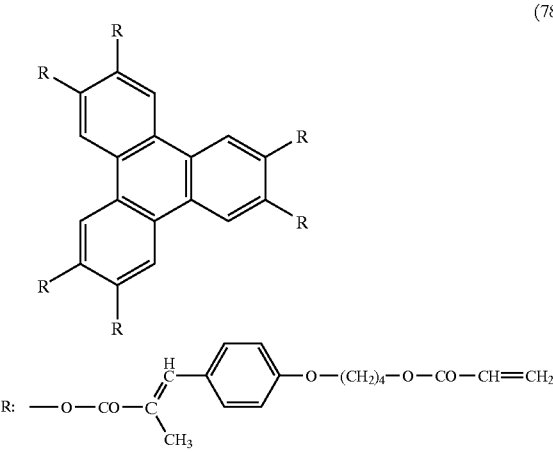

(6a) Synthesis of 4-(4-hydroxybutyloxy) benzaldehyde

In a 1 L three neck distillation flask, p-hydroxybenzaldehyde (24.4 g, 20 mmol), 4-chlorobutylacetate (36.1 g, 240 mmol), potassium carbonate (33.2 g, 240 mmol) and dimethylformamido (150 ml) were placed and stirred for 3 hours at 120° C. After the reaction mixture was cooled, water was added and the resulting mixture was extracted with ethyl acetate. The solvent was removed to obtain an oily product. The product was dissolved in methanol (100 ml), and potassium hydroxide (22.4 g, 0.4 mmol) dissolved in water (50 ml) was dropwise added to the solution. The mixture was refluxed for 2 hours, and then cooled. Water was added and the resulting mixture was extracted with ethyl acetate. The solvent was removed to obtain an oily product. The product was purified through column chromatography to prepare the titled compound (35.3 g, yield: 91%).

(6b) Synthesis of Methyl 3-[4-(4-Hydroxybutyloxy) phenyl]-2-butenic Acid

In a 300 ml three neck distillation flask, the compound (20 g, 103 mmol) obtained above in (6a), triethyl-2-phosphonopropionate (25.7 g, 108 mmol) and tetrahydrofuran (50 ml) were placed. To the mixture, 28 vol. % methanol solution of sodium ethoxide (21.8 g) was dropped. After the reaction mixture was stirred for 2 hours, dilute hydrochloric acid was added and the resulting mixture was extracted with ethyl acetate. The solvent was removed to obtain an oily product. The product was purified through column chromatography to prepare the titled compound (20.6 g, yield: 76%).

(6c) Synthesis of 3-[4-(4-Hydroxybutyloxy)phenyl]-2-butenic Acid

In a 300 ml three neck distillation flask, the compound prepared above in (6b) (20.4 g, 77.2 mmol) and methanol (50 ml) were placed. To the flask, aqueous solution (30 ml) of potassium hydroxide (8.66 g, 154 mmol) was dropwise added. After the mixture was refluxed for 2 hours, dilute hydrochloric acid was added to precipitate crystalline product. The product was collected by filtration, and recrystallized from acetonitrile to obtain the titled compounds (16.8 g, yield: 87%).

(6d) Synthesis of 2,3,6,7,10,11-Hexakis[4-(4-acryloyloxyoctyloxy)cinnamoyloxy]triphenylene (78)

The procedure of Synthesis Example 1 (1c) was repeated except that the compound prepared above in (6c) was used, to prepare the titled compound.

$^1$H-NMR (CDCl$_3$) δ:

1.90 (24H, brs) 2.20 (18H, s);
4.00 (12H, brs) 4.25 (12H, brs);
5.80 (6H, d) 6.10 (6H, dd);
6.40 (6H, d) 6.80 (12H, d);
7.25 (12H, d) 7.90 (6H, s);
8.35 (6H, s).

SYNTHESIS EXAMPLE 7

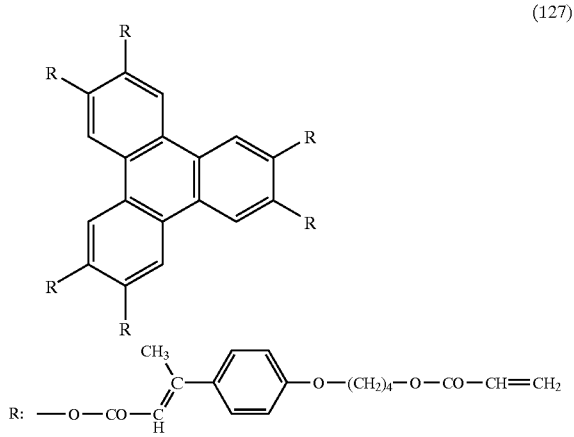

(127)

(7a) Synthesis of 4-(4-Hydroxybutyloxy) acetophenone

In a 1 L three neck distillation flask, p-hydroxyacetophenone (27.2 g, 20 mmol), 4-chlorobutylacetate (36.1 g, 240 mmol), potassium carbonate (33.2 g, 240 mmol) and dimethylformamido (150 ml) were placed and stirred for 3 hours at 120° C. After the reaction mixture was cooled, water was added and the resulting mixture was extracted with ethyl acetate. The solvent was removed to obtain an oily product. The product was dissolved in methanol (100 ml), and potassium hydroxide (22.4 g, 0.4 mmol) dissolved in water (50 ml) was dropwise added to the solution. The mixture was refluxed for 2 hours, and then cooled. Water was added, and the resulting mixture was extracted with ethyl acetate. The solvent was removed to obtain an oily product. The product was purified through column chromatography to prepare the titled compound (35.3 g, yield: 85%).

(7b) Synthesis of Methyl 3-[4-(4-Hydroxybutyloxy) phenyl]-2-methylacrylic Acid In a 300 ml three neck distillation flask, the compound (15 g, 72.0 mmol) prepared above in (7a), triethylphosphonoacetate (17.0 g, 75.6 mmol) and tetrahydrofuran (50 ml) were placed. To the mixture, 28 vol. % methanol solution of sodium ethoxide (15.3 g) was dropped. After the reaction mixture was refluxed for 3 hours, dilute hydrochloric acid was added and the resulting mixture was extracted with ethyl acetate. The solvent was removed, and the remaining portion was purified through column chromatography to prepare the titled compound (13.6 g, yield: 68%).

(7c) Synthesis of 3-[4-(4-Hydroxybutyloxy)phenyl]-2-methylacrylic Acid

In a 300 ml three neck distillation flask, the compound prepared above in (7b) (13.6 g, 48.9 mmol) and methanol (50 ml) were placed. To the flask, aqueous solution (30 ml) of potassium hydroxide (5.5 g, 98 mmol) was dropwise added. After the mixture was refluxed for 2 hours, dilute hydrochloric acid was added to precipitate crystalline product. The product was collected by filtration, and recrystallized from acetonitrile to obtain the titled compounds (7.0 g, yield: 57%).

(7d) Synthesis of 2,3,6,7,10,11-Hexakis[4-(4-acryloyloxyoctyloxy)cinnamoyloxy]triphenylene (127)

The procedure of Synthesis Example 1 (1c) was repeated except that the compound prepared above in (7c) was used, to prepare the titled compound.

$^1$H-NMR (CDCl$_3$) δ:

| | |
|---|---|
| 1.90 (24H, brs) | 2.60 (18H, s) |
| 4.00 (12H, brs) | 4.25 (12H, brs) |
| 5.80 (6H, d) | 6.10 (6H, dd) |
| 6.35 (6H, d) | 6.80 (12H, d) |
| 7.45 (12H, d) | 8.35 (6H, s) |

[Properties of Discotic Liquid Crystal Molecules]

With respect to the discotic liquid crystal molecules (20), (18), (22), (24), (28), (78) and (127) prepared in Synthesis Examples 1 to 7, liquid crystal phases were observed by a DCS (differential scanning calorimeter) and a polarizing microscope. The results are shown in Table 1. For example, in the case of discotic liquid crystal compound (20), crystal phase changes into N$_D$ phase at 124° C. and the N$_D$ phase further changes into isotropic liquid at 222° C.

TABLE 1

| Compound | Phase transition point |
|---|---|
| 20: | Crystal→124° C.→N$_D$→222° C.→Isotropic liquid |
| 18: | Crystal→97° C.→Columnar→105° C.→N$_D$→195° C.→Isotropic |
| 22: | Crystal→97° C.→Columnar→105° C.→N$_D$→195° C.→isotropic |
| 24: | Crystal→124° C.→N$_D$→180° C.→Isotropic liquid |
| 28: | Crystal→117° C.→N$_D$→162° C.→Isotropic liquid |
| 78: | Crystal→60° C.→Columnar→78° C.→N$_D$→219° C.→Isotropic |
| 127: | Crystal→85° C.→Columnar→90° C.→N$_D$→165° C.→Isotropic |

EXAMPLE 1

The following acrylic copolymer and triethylamine (20 wt. % based on the amount of the acrylic copolymer) were dissolved in a mixed solvent of methanol/water (volume ratio: 30/70) to prepare 5 wt. % solution.

(Acrylic copolymer)

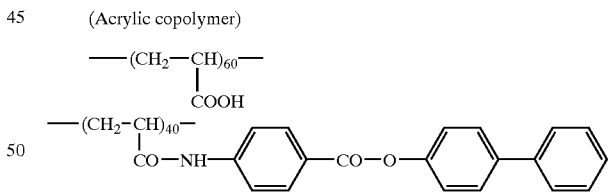

The solution was applied on a glass plate (thickness: 1.1 mm) by means of a bar coater, and dried by air at 100° C. for 5 minutes. The surface was subjected to rubbing treatment to form an orientation layer for vertical alignment.

1.0 g of the compound (20) prepared in Synthesis Example 1, 10 mg of cellulose acetate butyrate (CAB-551-0.2, Eastman Chemical; acetylation degree: 20%; butyrylation degree: 52.0%), 25 mg of the following chiral agent and 30 mg of a photopolymerization initiator (Irgacure 907, CibaGeigy) were mixed and dissolved in methyl ethyl ketone to prepare a coating solution for optically anisotropic layer (solid content: 30 wt. %).

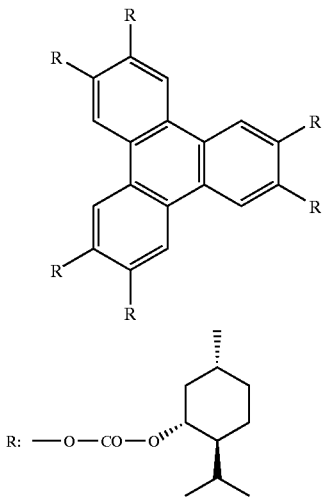

The coating solution was applied on the above-prepared orientation layer by means of a bar coater, to form a layer of discotic liquid crystal molecules. The naked surface (bottom surface) of the glass support was made to be in contact with a heated metal roller (a surface temperature: 160° C.) for 1 minute, and then further made to be in contact with a slightly heated metal roller (a surface temperature: 30° C.) for 1 minute. The coated surface was exposed to ultraviolet light from a 16 W ultraviolet ray irradiating apparatus (UVL-58, ULTRA-VIOLETPRODUCT) for 10 seconds, to prepare an optical compensatory sheet.

A polarized ray was applied from the support side to the sheet at an angle of 45° to the rubbing axis of the orientation layer, and the transmitted ray was subjected to polarization analysis by means of a multi-channel photo-analyzer (Ohotsuka-Denshi Co., Ltd.) to find the twist angle in the range of 230° to 250° C. The retardation (Δnd) at 550 nm was also measured to find 820 nm. From the obtained retardation (Δnd) and the independently measured thickness (d), Δn was determined to be 0.155.

EXAMPLE 2

The following denatured polyvinyl alcohol was dissolved in a mixed solvent of N-methylpyrrolidone/methyl ethyl ketone (volume ratio: 20/80) to prepare 5 wt. % solution.

Denatured polyvinly alcohol)

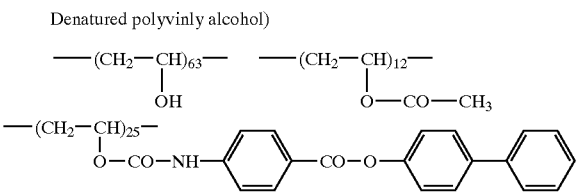

The solution was applied on a glass plate (thickness: 1.1 mm) by means of a bar coater, and dried by air at 80° C. for 10 minutes. The surface was subjected to rubbing treatment to form an orientation layer for vertical alignment.

An optically anisotropic layer was formed on the orientation layer in the same manner as Example 1, to prepare an optical compensatory sheet.

A polarized ray was applied from the support side to the sheet at an angle of 45° to the rubbing axis of the orientation layer, and the transmitted ray was subjected to polarization analysis by means of a multi-channel photo-analyzer (Ohotsuka-Denshi Co., Ltd.) to find the twist angle in the range of 230° to 250° C. The retardation (Δnd) at 550 nm was also measured to find 820 nm. From the obtained retardation (Δnd) and the independently measured thickness (d)(5.4 μm), Δn was determined to be 0.152.

COMPARISON EXAMPLE 1

The procedure of Example 1 was repeated except that the following discotic liquid crystal molecule (x) for comparison was used, to prepare an optical compensatory sheet.

In the same manner as Example 1, Δn was determined to be 0.075. The applicants tried producing, by using the discotic liquid crystal molecules (x), an optical compensatory sheet having the same Δnd as the sheet of Example 1. The obtained sheet was thicker than the sheet of Example 1, and the discotic liquid crystal molecules (x) in the obtained sheet were not oriented in monodomain alignment.

(Discotic liquid crystal molecule (x))

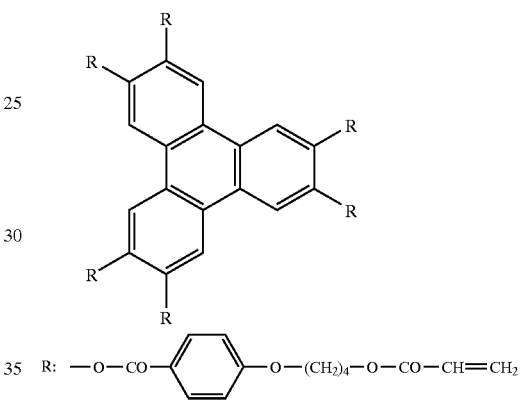

COMPARISON EXAMPLE 2

The procedure of Example 2 was repeated except that the discotic liquid crystal molecule (x) for comparison was used, to prepare an optical compensatory sheet.

In the same manner as Example 2, Δn was determined to be 0.075. The applicants tried producing, by using the discotic liquid crystal molecules (x), an optical compensatory sheet having the same Δnd as the sheet of Example 2. The obtained sheet was thicker than the sheet of Example 2, and the discotic liquid crystal molecules (x) in the obtained sheet were not oriented in monodomain alignment.

EXAMPLE 3

By using the optical compensatory sheet of Example 1, a liquid crystal display of an STN mode shown in FIG. 3(e) was prepared. The aligning direction of rod-like liquid crystal molecules in the liquid crystal cell was set to be parallel to that of the discotic liquid crystal molecules in the compensatory sheet. In the viewing side, the angle between the absorbing axis of the polarizing element and the aligning direction of rod-like liquid crystal molecules was set to be 45°. The absorbing axis of the polarizing element in backlight side was set to be perpendicular to that of the polarizing element in viewing side.

When voltage was applied to the prepared liquid crystal display of an STN mode, the display showed normally black mode. The angle range giving a contrast ratio not less than 5 is more than 120° horizontally and more than 150° vertically.

EXAMPLE 4

Polyvinyl alcohol (PVA-203, Kuraray Co., Ltd.) was dissolved in a mixed solvent of methanol/water (volume ratio: 20/80) to prepare 5 wt. % solution.

The solution was applied on a glass plate (thickness: 1.1 mm) by means of a bar coater, and dried by air at 80° C. for 10 minutes. The surface was subjected to rubbing treatment to form an orientation layer.

9.0 g of the compound (20) prepared in Synthesis Example 1, 1.0 g of ethylene glycol-denatured trimethylol-propanetriacrylate (V#360, Osaka Yuki Kagaku Kogyo Co., Ltd.), 0.3 g of the following photopolymerization initiator and 0.05 g of the following fluorine-containing polymer were dissolved in methyl ethyl ketone to prepare a coating solution for optically anisotropic layer (solid content: 25 wt. %).

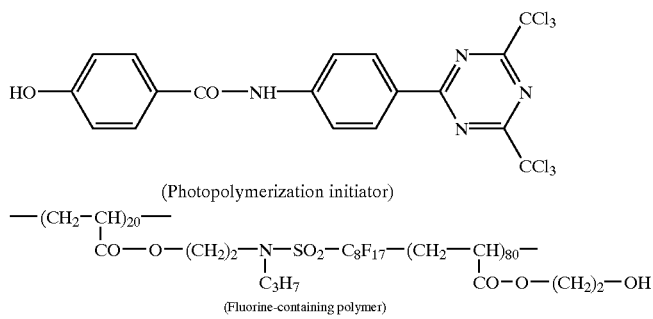

(Photopolymerization initiator)

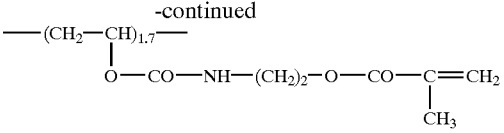

The solution was applied on a gelatin thin layer (thickness: 0.1 μm) formed on a cellulose triacetate film (thickness: 100 μm) by means of a bar coater, and dried by air at 80° C. for 10 minutes. The surface was subjected to rubbing treatment to form an orientation layer.

The coating solution used in Example 4 was applied on the above-prepared orientation layer by means of a bar coater, to form a layer. The naked surface (bottom surface) of the glass support was made to be in contact with a heated metal roller (a surface temperature: 130° C.) for 1 minute, The coating solution was applied on the above-prepared orientation layer by means of a bar coater, to form a layer of discotic liquid crystal molecules. The naked surface (bottom surface) of the glass support was made to be in contact with a heated metal roller (a surface temperature: 130° C.) for 1 minute, and then further made to be in contact with a slightly heated metal roller (a surface temperature: 300° C.) for 1 minute. The coated surface was exposed to ultraviolet light from a 16 W ultraviolet ray irradiating apparatus (UVL-58, ULTRA-VIOLETPRODUCT) for 10 seconds, to prepare an optical compensatory sheet.

With respect to the produced optical compensatory sheet, the retardation (Δnd) and the inclined angle (β) of the optical axis were measured by ellipsometry (M-150, JASCO). Since Δnd was not 0 even at the minimum (this meant there was no optical axis), the angle giving the minimum was considered as an apparent inclined angle (β). From the obtained retardation (Δnd) and the independently measured thickness (d), Δn was determined. As a result, Δn of 0.075 and β of 38° were obtained.

EXAMPLE 5

The following denatured polyvinyl alcohol and glutaric aldehyde (5 wt. % based on the amount of denatured polyvinyl alcohol) was dissolved in a mixed solvent of methanol/water (volume ratio: 20/80) to prepare 5 wt. % solution.

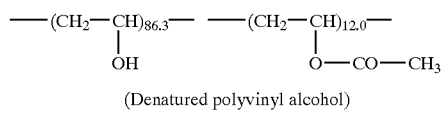

(Denatured polyvinyl alcohol)

and then further made to be in contact with a slightly heated metal roller (a surface temperature: 30° C.) for 1 minute. The coated surface was exposed to ultraviolet light from a 16 W ultraviolet ray irradiating apparatus (UVL-58, ULTRA-VIOLET-PRODUCT) for 10 seconds, to prepare an optical compensatory sheet.

With respect to the produced optical compensatory sheet, the retardation (Δnd) and the inclined angle (β) of the optical axis were measured by ellipsometry (M-150, JASCO). Since Δnd was not 0 even at the minimum (this meant there was no optical axis), the angle giving the minimum was considered as an apparent inclined angle (β). As a result, Δnd of 160 nm and β of 220 were obtained.

Further, the refractive anisotropy (Δn) calculated from Δnd and the thickness (d) was 0.070.

EXAMPLE 6

A liquid crystal cell of TN mode was obtained by separating two polarizing plates from a commercially available liquid crystal display (liquid crystal color TV of TFT type, 6E-C3, Sharp Co., Ltd.). Two optical compensatory sheets prepared in Example 5 was attached to both sides of the liquid crystal cell. Further, two polarizing plates were attached to both sides of the optical compensatory sheets. The polarizing plates were so arranged that the polarizing axes of the plates were perpendicular to each other.

The viewing angle of the obtained color liquid crystal display was measured by displaying white or black image. The viewing angle was determined as an angle at which an image having a contrast of 10:1 or more can be obtained. In more detail, a voltage of a square wave was applied to the color liquid crystal display. The contrast was measured from front, upward, downward, leftward or rightward direction by using a spectrometer (LCD-5000, Otsuka Denshi, Co., Ltd.).

The viewing angle showing a contrast of 10 was determined between upward and downward directions and between leftward and rightward directions. As a result, the viewing angle between upward and downward directions was 123°, and the viewing angle between leftward and rightward directions was 115°.

We claim:

1. An optical compensatory sheet comprising a transparent support, an orientation layer and an optically anisotropic layer formed from discotic liquid crystal molecules represented by the formula (Ia) in this order, said optically anisotropic layer having a refractive anisotropy in the range of 0.065 to 0.16:

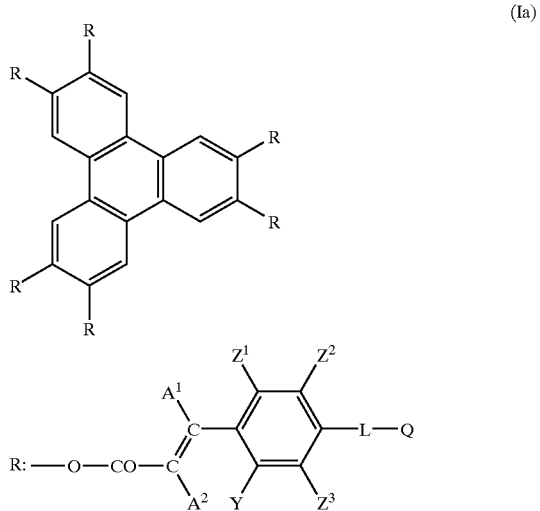

in which each of $A^1$ and $A^2$ independently is hydrogen, a halogen atom, an alkyl group having 1 to 12 carbon atoms or an alkoxy group having 1 to 12 carbon atoms; Y is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms, or Y is combined with $A^2$ to form a five-membered or six-membered ring; each of $Z^1$, $Z^2$ and $Z^3$ independently is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms; L is a divalent linking group selected from the group consisting of —O—, —CO—, —S—, —NH—, an alkylene group, an alkenylene group, an alkynylene group, an arylene group and a combination thereof; and Q is a polymerizable group selected from the group consisting of an ethylenically unsaturated group, an epoxy group and an aziridinyl group.

2. The optical compensatory sheet as defined in claim 1, wherein the orientation layer comprises a denatured polyvinyl alcohol, an acrylic copolymer or a mIethacrylic copolymer, each of which has a repeating unit represented by the formula (II) in an amount of 1 to 90 mol. %:

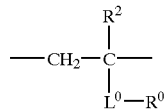

in which $R^2$ is hydrogen, a halogen atom or an alkyl group having 1 to 6 carbon atoms; $L^0$ is a divalent linking group selected from the group consisting of —O—, —CO—, —NH—, —SO$_2$—, an alkylene group, an alkenylene group, an arylene group and a combination thereof; and $R^0$ is a hydrocarbon group having 10 to 100 carbon atoms which can be substituted with fluorine.

3. The optical compensatory sheet as defined in claim 1, wherein the optically anisotropic layer has an refractive anisotropy in the range of 0.090 to 0.16

4. The optical compensatory sheet as defined in claim 1, wherein each of $A^1$ and $A^2$ in the formula (Ia) independently is hydrogen, an alkyl group having 1 to 6 carbon atoms or an alkoxy group having 1 to 6 carbon atoms.

5. The optical compensatory sheet as defined in claim 1, wherein Y in the formula (1a) is hydrogen, a halogen atom, an alkyl group having 1 to 12 carbon atoms or an alkoxy group having 1 to 12 carbon atoms.

6. The optical compensatory sheet as defined in claim 1, wherein each of $Z^1$, $Z^2$ and $Z^3$ in the formula (Ia) independently is an alkyl group having 1 to 12 carbon atoms.

7. The optical compensatory sheet as defined in claim 1, wherein L in the formula (Ia) is a combination of at least two divalent groups selected from the group consisting of —O—, —CO—, —S—, —NH—, an alkylene group, an alkenylene group, an alkynylene group and an arylene group.

8. The optical compensatory sheet as defined in claim 1, wherein Q in the formula (Ia) is an ethylenically unsaturated group.

9. The optical compensatory sheet as defined in claim 1, wherein the discotic liquid crystal molecules in the optically anisotropic layer are aligned and twisted at a twist angle of 90° to 360°.

10. The optical compensatory sheet as defined in claim 9, wherein the optically anisotropic layer contains a compound having optical rotatory power.

11. The optical compensatory sheet as defined in claim 1, wherein the discotic liquid crystal molecules are aligned at an average inclined angle of 50° to 90° to the plane of the transparent support.

12. The optical compensatory sheet as defined in claim 1, wherein the discotic liquid crystal molecules are so aligned that the inclined angle changes according to the distance between the molecule and the plane of the transparent support.

13. A liquid crystal display comprising a liquid crystal cell of an STN mode, two polarizing plates placed on both sides of the liquid crystal cell, and one or two optical compensatory sheets placed between the liquid crystal cell and the polarizing plate, wherein the optical compensatory sheet comprises a transparent support, an orientation layer and an optically anisotropic layer formed from discotic liquid crystal molecules represented by the formula (Ia) in this order, said optically anisotropic layer having a refractive anisotropy in the range of 0.065 to 0.16, and said discotic liquid crystal molecules being aligned at an average inclined angle of 50° to 90° and being twisted at a twist angle of 90° to 360°:

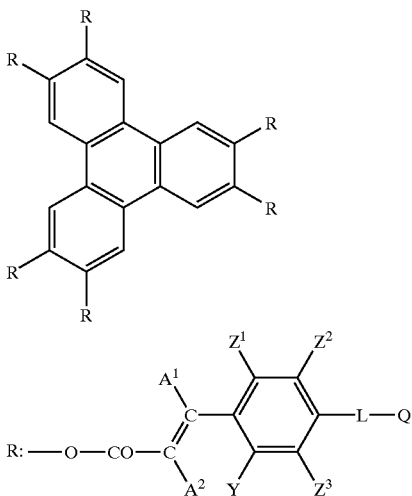

(Ia)

in which each of $A^1$ and $A^2$ independently is hydrogen, a halogen atom, an alkyl group having 1 to 12 carbon atoms or an alkoxy group having 1 to 12 carbon atoms; Y is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms, or Y is combined with $A^2$ to form a five-membered or six-membered ring; each of $Z^1$, $Z^2$ and $Z^3$ independently is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms; L is a divalent linking group selected from the group consisting of —O—, —CO—, —S—, —NH—, an alkylene group, an alkenylene group, an alkynylene group, an arylene group and a combination thereof; and Q is a polymerizable group.

14. A liquid crystal display comprising a liquid crystal cell of a TN mode, two polarizing plates placed on both sides of the liquid crystal cell, and one or two optical compensatory sheets placed between the liquid crystal cell and the polarizing plate, wherein the optical compensatory sheet comprises a transparent support, an orientation layer and an optically anisotropic layer formed from discotic liquid crystal molecules represented by the formula (Ia) in this order, said optically anisotropic layer having a refractive anisotropy in the range of 0.065 to 0.16, and said discotic liquid crystal molecules being so aligned that the inclined angle changes according to the distance between the molecule and the plane of the transparent support:

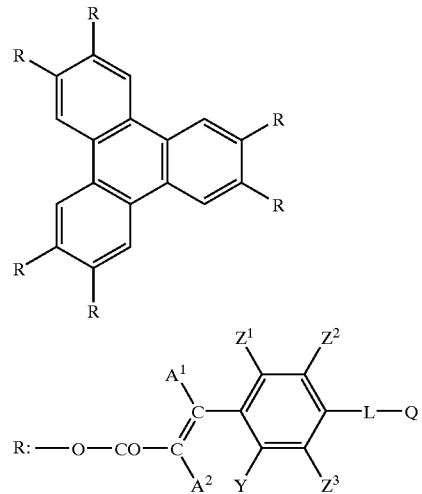

(Ia)

in which each of $A^1$ and $A^2$ independently is hydrogen, a halogen atom, an alkyl group having 1 to 12 carbon atoms or an alkoxy group having 1 to 12 carbon atoms; Y is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms, or Y is combined with $A^2$ to form a five-membered or six-membered ring; each of $Z^1$, $Z^2$ and $Z^3$ independently is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms; L is a divalent linking group selected from the group consisting of —O—, —CO—, —S—, —NH—, an alkylene group, an alkenylene group, an alkynylene group, an arylene group and a combination thereof; and Q is a polymerizable group selected from the group consisting of an ethylenically unsaturated group, an epoxy group and an aziridinyl group.

* * * * *